US011507802B2

(12) United States Patent
Abhinav et al.

(10) Patent No.: US 11,507,802 B2
(45) Date of Patent: Nov. 22, 2022

(54) RECURSIVE LEARNING FOR ARTIFICIAL INTELLIGENT AGENTS

(71) Applicant: Accenture Global Solutions Limited, Dublin (IE)

(72) Inventors: Kumar Abhinav, Hazaribag (IN); Alpana Dubey, Bangalore (IN); Sakshi Jain, Bangalore (IN); Veenu Arora, Sriganganagar (IN); Hindnavis Vijaya Sharvani, Hyderabad (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 731 days.

(21) Appl. No.: 16/557,515

(22) Filed: Aug. 30, 2019

(65) Prior Publication Data

US 2020/0257963 A1    Aug. 13, 2020

(30) Foreign Application Priority Data

Feb. 13, 2019  (IN) .............................. 201941005698

(51) Int. Cl.
*G06N 3/04* (2006.01)
*G06F 17/18* (2006.01)
*G06N 20/00* (2019.01)

(52) U.S. Cl.
CPC ........... *G06N 3/0454* (2013.01); *G06F 17/18* (2013.01); *G06N 20/00* (2019.01)

(58) Field of Classification Search
CPC ....... G06N 3/0454; G06N 20/00; G06F 17/18

USPC .......................................................... 706/15
See application file for complete search history.

(56) References Cited

U.S. PATENT DOCUMENTS

| 10,950,021 | B2* | 3/2021 | Dubey ...................... G06T 7/11 |
| 2019/0122162 | A1* | 4/2019 | Abhinav ........ G06Q 10/063118 |
| 2019/0354887 | A1* | 11/2019 | Subramanian ......... G09B 5/065 |
| 2020/0202598 | A1* | 6/2020 | Bhardwaj ................ G06T 5/50 |

OTHER PUBLICATIONS

Rakesh Agarwal, Ramakrishnan Srikant, et al. 1994. Fast algorithms for mining association rules. In Proc. of the 20th VLDB Conference. pp. 487-499.

(Continued)

*Primary Examiner* — William D Titcomb
(74) *Attorney, Agent, or Firm* — Crowell & Moring LLP

(57) ABSTRACT

The present disclosure relates to a system, and method for computer-based recursive learning of artificial intelligence (AI) apprentice agents. The system includes a system circuitry in communication with a database and a memory. The system circuitry is configured to receive a new data-structure comprising one or more inputs and a goal, and convert, using a perception agent, the one or more inputs of the new data-structure into one or more input feature parameters of the new data-structure. The system circuitry is configured to obtain, using a reasoning agent, an action for the new data-structure, and determine, using an evaluation agent, whether the action for the new data-structure generates the goal of the new data-structure. When it is determined that the action generates the goal of the new data-structure, the system circuitry is further configured to store the new data-structure in the database.

20 Claims, 17 Drawing Sheets

(56) References Cited

OTHER PUBLICATIONS

Travis Angevine and Foaad Khosmood. 2016. MimicA: A General Framework for SelfLearning Companion AI Behavior. Ph.D. Dissertation. California Polytechnic State University.
Christopher G Atkeson and Stefan Schaal. 1997. Robot learning from demonstration. In ICML, vol. 97. Citeseer, pp. 12-20.
Sung-Hyuk Cha. 2007. Comprehensive survey on distance/similarity measures between probability density functions. *City* 1, 2 (2007), 1.
Jonathan Dinerstein, Parris K Egbert, Dan Ventura, and Michael Goodrich. 2008. Demonstration-based behavior programming for embodied virtual agents. *Computational Intelligence* 24, 4 (2008), pp. 235-256.
Michael Floyd. 2013. *A General-Purpose Framework for Learning by Observation*. Carleton University.
Floyd, M., and Babak Esfandiari. "Building learning by observation agents using jloaf." *Workshop on Case-Based Reasoning for Computer Games: 19th international conference on Case-Based Reasoning,(Figure 1)*. 2011.
Michael W Floyd and Babak Esfandiari. 2011. A case-based reasoning framework for developing agents using learning by observation. In *Tools with Artificial Intelligence (ICTAI), 2011 23rd IEEE International Conference on*. IEEE, pp. 531-538.
Daniel H Grollman and Odest Chadwicke Jenkins. 2007. Learning robot soccer skills from demonstration. In *Development and Learning, 2007. ICDL 2007. IEEE 6th International Conference on*. IEEE, pp. 276-281.
Sepp Hochreiter and Jürgen Schmidhuber. 1997. Long short-term memory. *Neural computation* 9, 8 (1997), pp. 1735-1780.
Tomas Mikolov, Ilya Sutskever, Kai Chen, Greg S Corrado, and Jeff Dean. 2013. Distributed representations of words and phrases and their compositionality. In *Advances in neural information processing systems*. pp. 3111-3119.
Santiago Ontanón, Kane Bonnette, Prafulla Mahindrakar, Marco A Gómez-Martín, Katie Long, Jainarayan Radhakrishnan, Rushabh Shah, and Ashwin Ram. 2009. Learning from human demonstrations for real-time case-based planning. (2009).
Santiago Ontañón, Kinshuk Mishra, Neha Sugandh, and Ashwin Ram. 2007. Case-based planning and execution for real-time strategy games. In *International Conference on Case-Based Reasoning*. Springer, pp. 164-178.
Jeffrey Pennington, Richard Socher, and Christopher Manning. 2014. Glove: Global vectors for word representation. In *Proceedings of the 2014 conference on empirical methods in natural language processing (EMNLP)*. pp. 1532-1543.
Ashwin Ram and Anthony Francis. 1996. Multi-plan retrieval and adaptation in an experience-based agent. *Case-Based Reasoning: experiences, lessons, and future directions* (1996), pp. 167-184.
Houcine Romdhane and Luc Lamontagne. 2008. Forgetting reinforced cases. In *European Conference on Case-Based Reasoning*. Springer, pp. 474-486.
Christian Schuldt, Ivan Laptev, and Barbara Caputo. 2004. Recognizing human actions: a local SVM approach. In *Pattern Recognition, 2004. ICPR 2004. Proceedings of the 17th International Conference on*, vol. 3. IEEE, pp. 32-36.
Gavin Scott and Foaad Khosmood. 2018. A Framework for Complementary Companion Character Behavior in Video Games. arXiv preprint arXiv:1808.09079 (2018).
Karen Simonyan and Andrew Zisserman. 2014. Very deep convolutional networks for large-scale image recognition. *arXiv preprint arXiv:1409.1556* (2014).
Nitish Srivastava, Geoffrey Hinton, Alex Krizhevsky, Ilya Sutskever, and Ruslan Salakhutdinov. 2014. Dropout: a simple way to prevent neural networks from overfitting. *The Journal of Machine Learning Research* 15, 1 (2014), pp. 1929-1958.
Rui Xu and Donald Wunsch. 2005. Survey of clustering algorithms. *IEEE Trans-actions on neural networks* 16, 3 (2005), pp. 645-678.
Chunting Zhou, Chonglin Sun, Zhiyuan Liu, and Francis Lau. 2015. A C-LSTM neural network for text classification. *arXiv preprint arXiv:1511.08630* (2015).
Floyd, Michael W., J. T. Turner, and David W. Aha. "Using deep learning to automate feature modeling in learning by observation." 30th international Florida artificial intelligence research society conference. AAAI Press. 2017.
Ontañón, Santiago, et al. "Learning from demonstration and case-based planning for real-time strategy games." *Soft Computing Applications in Industry*. Springer, Berlin, Heidelberg, 2008. pp. 293-310.
H. James Wilson and Paul R. Daugherty, "Collaborative Intelligence: Humans and AI Are Joining Forces," 2018, https://hbr.org/2018/07/collaborative-intelligence-humans-and-ai-are-joining-forces, 17 pages, Jul.-Aug. 2018 issue of Harvard Business Review.
Robert Hecht-Nielsen, "Theory of the backpropagation neural network," 1992, 13 pages (I593-I605), In Neural networks for perception.
Nasser, Sara, Rawan Alkhaldi, and Gregory Vert. "A modified fuzzy k-means clustering using expectation maximization," 2006 IEEE International Conference on Fuzzy Systems. IEEE, 2006, 6 pages.
Nasser M Nasrabadi. 2007. Pattern recognition and machine learning. Journal of electronic imaging, Christopher M. Bishop, 16, 4 2007, 82 pages.
Leif E Peterson, K-nearest neighbor. Scholarpedia 4, 2, 2009, 12 pages.
Yan Ye, Zhibin Jiang, Xiaodi Diao, and Gang Du. 2011. Extended event-condition-action rules and fuzzy Petri nets based exception handling for workflow management, 2011, 3 pages.

* cited by examiner

| Feature | Description |
|---|---|
| Name | Placement |
| Style | Play style |
| GameCycle | The moment in time |
| Score | Score of the player |
| TotalNumUnits | Total number of units built during the game |
| TotalNumBuildings | Total number of buildings built during the game |
| TotalKills | Total number of enemy soldiers killed during the game |
| TotalRazings | Total number of buildings destroyed during the game |
| TotalUnits | Total number of units possessed at current game cycle |
| TotalBuildings | Total number of buildings possessed at current game cycle |
| Supply | Food supplied by farms at current game cycle |
| Demand | Food demanded at current game cycle |
| TotalGold | Total amount of gold gathered during the game |

Figure 15

RECURSIVE LEARNING FOR ARTIFICIAL INTELLIGENT AGENTS

RELATED APPLICATION

This application claims priority to Indian Patent Application No. 201941005698, filed with the Indian Patent Office on Feb. 13, 2019, which is incorporated by reference in its entirety.

TECHNICAL FIELD

This disclosure relates to artificial intelligence (AI), and is particularly directed to human and AI collaborations.

BACKGROUND

Over the past decade, human and AI collaboration has evolved at a very noticeable pace. Humans may have digital colleagues and assistants, e.g., AI agents or tools, to support them in their daily activities.

There are many challenges and drawbacks with currently available systems and methods for AI agent learning. One of the challenges is that tasks assigned to the AI agents can be dynamic in nature and can change over time. This may lead to acquiring new computer models or algorithms to implement new skills or re-training of the existing computer algorithms and models to improvise the same task. Another challenge is that developers need to spend a significant amount of time and effort in hand coding specific actions for a new domain.

The present disclosure describes a system, a method, and a product for AI agent apprenticeship learning, which may address some of the challenges and drawbacks discussed above.

SUMMARY

The present disclosure describes a system for computer-based recursive learning. The system includes a database for storing historically validated data-structures wherein each historical data-structure comprises a goal, a set of sensor data, and a set of corresponding action parameters in response to the set of sensor data for achieving the goal of the historical data-structure. The system also includes a memory for storing a computer-based recursive e-learning model comprising a perception agent, a reasoning agent, and an evaluation agent. The system further includes system circuitry in communication with the database and the memory. The system circuitry is configured to receive an input data-structure comprising one or more sensor inputs and a goal of the input data-structure, and convert, using the perception agent, the one or more sensor inputs of the input data-structure into an input feature vector of a predetermined dimension. The system circuitry is also configured to obtain, using the reasoning agent, a predicted action corresponding to the input feature vector and the goal of the input data-structure based on the historically validated data-structures, and determine, using the evaluation agent, whether the predicted action simulatively produces the goal of the input data-structure. When it is determined that the predicted action simulatively produces the goal of the input data-structure, the system circuitry is further configured to store the input data-structure and the predicted action in the database as part of the historically validated data-structures.

The present disclosure also describes a method for computer-based recursive learning. The method includes receiving, by a system, an input data-structure comprising one or more sensor inputs and a goal of the input data-structure. The system includes a memory for storing instructions, a database for storing historically validated data-structures, and system circuitry in communication with the database and the memory. Each historical data-structure includes a goal of the historical data-structure, a set of sensor data, and a set of corresponding action parameters in response to the set of sensor data for achieving the goal of the historical data-structure. The method includes converting, by the system, the one or more sensor inputs into an input feature vector of a predetermined dimension, and obtaining, by the system, a predicted action corresponding to the input feature vector and the goal of the input data-structure based on the historically validated data-structures. The method also includes determining, by the system, whether the predicted action simulatively produces the goal of the input data-structure. When it is determined that the predicted action simulatively produces the goal of the input data-structure, the method includes storing, by the system, the input data-structure and predicted action in the database as part of the historically validated data-structures.

The present disclosure further describes a product for computer-based recursive learning. The product includes machine-readable media other than a transitory signal, instructions stored on the machine-readable media, and a processor in communication with the machine-readable media. When the processor executes the instructions, the processor is configured to receive an input data-structure comprising one or more sensor inputs and a goal, and convert the one or more sensor inputs into an input feature vector of a predetermined dimension. When the processor executes the instructions, the processor is also configured to obtain a predicted action corresponding to the input feature vector and the goal based on historically validated data-structures stored in a database, and determine whether the predicted action simulatively produces the goal. When it is determined that the predicted action simulatively produce the goal, the processor is further configured to store the input data-structure and predicted action in the database as part of the historically validated data-structures.

BRIEF DESCRIPTION OF THE DRAWINGS

FIG. 15 shows an exemplary data attribute with a game of WARGUS.

DETAILED DESCRIPTION

Figure 1:
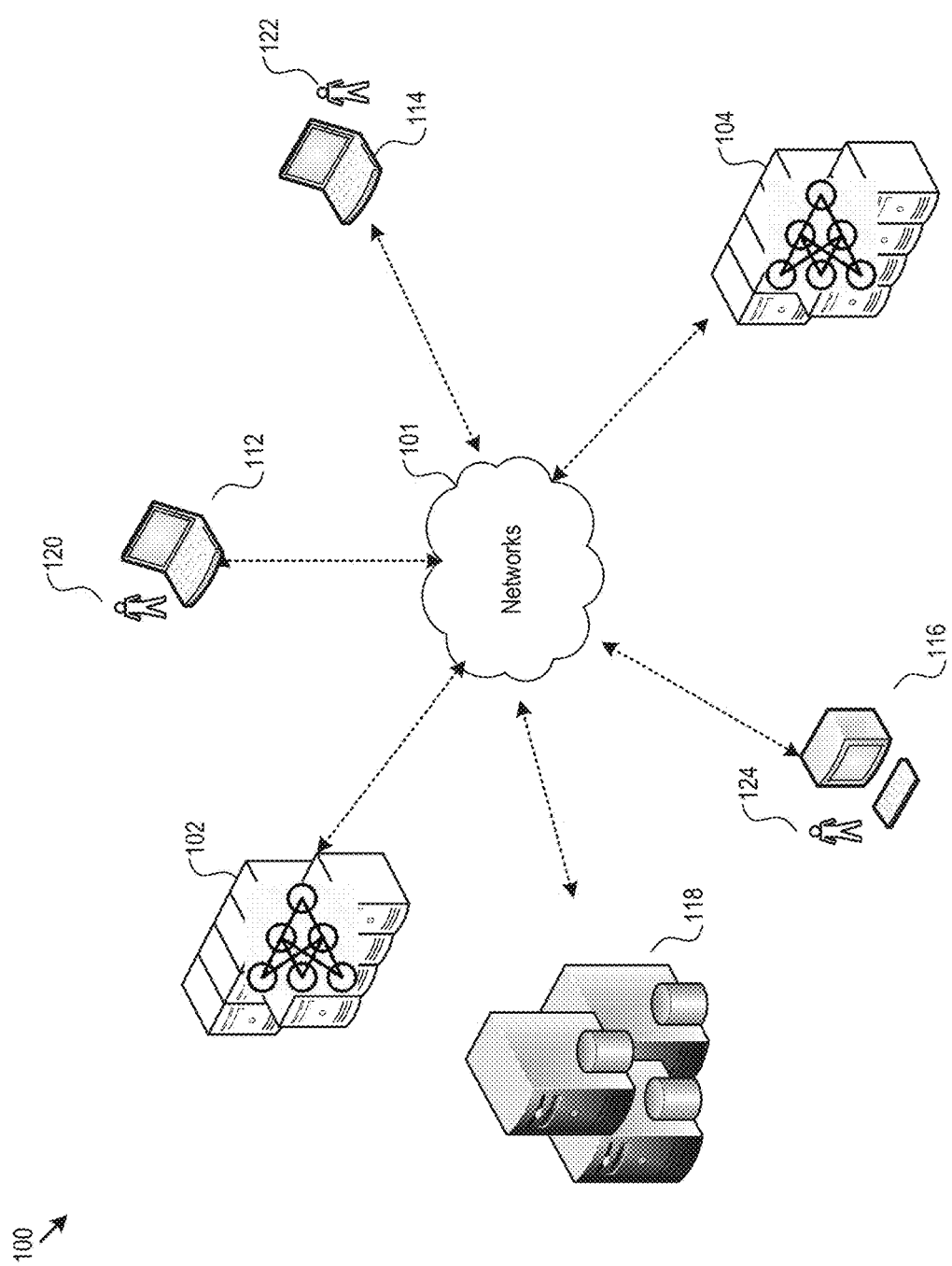
FIG. 1 shows an exemplary electronic communication environment for implementing apprenticeship learning.

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Humans and AI collaboration can yield better and more productive results. Human strengths include creativity, improvisation, dexterity, judging, and social and leadership abilities, whereas machine strengths include speed, accuracy, repetition, predictive capabilities, and scalability. Machines are good at performing repetitive tasks and analyzing huge data sets, while humans are good at resolving ambiguous information and exercising judgment in difficult situations. Thus, humans and AI bring complimentary skills. AI is also creating new roles and opportunities for people. A large number of jobs will focus on humans training the machines for varied tasks. In the future, most of the tasks will be partly handled by machines and partly by humans, resulting in human and AI partnership.

The tasks assigned to the AI agents may be dynamic in nature and change over time. This may lead to acquiring new skills or re-training of the AI agents to execute the same task. To develop such AI agents, the developer may need to program these AI agents to perform a specific task. An AI agent may ideally be capable of moving to another domain without any significant modifications from the developer. However, developers may need to spend a significant amount of time and effort in hand coding specific actions for a new domain.

The present disclosure describes a system and method for computer-based recursive learning of an AI apprentice agent. Apprenticeship learning is the process of a computer learning to perform actions by observing an expert demonstrating behaviors or actions for a specific goal. This may transfer the burden of training from the programmer to the AI agent. Instead of being explicitly trained by the programmer, the AI agent may learn from the expert demonstrations and execute similar actions when presented with similar sensory inputs. The AI agent may observe the expert's actions to sensory inputs and then may train itself using the observed data. The term "apprenticeship learning" as used in the disclosure corresponds to a computer-based recursive learning.

The described system may help in developing apprentice AI agents that learn from human demonstration. The system may facilitate the AI agents to introspect, self-diagnose and correct its actions in case of failure.

The apprentice agent may observe and watch the behavior or action of its human colleague, which is a kind of background learning. Beyond background learning, the system may also facilitate the apprenticeship relationship by escalating questions it may not answer to a human colleague, all the while observing how the problem is solved. The system may alleviate the need to explicitly program the apprentice agents. The present disclosure also demonstrates how an apprentice agent may be developed using the system and may be able to perform the action.

The present disclosure describes many novel features, including but not limited to: 1) trace representation: capture of the trace from human demonstration; 2) self-diagnosis: self-diagnosing, learning and correcting from the mistakes; 3) extensive user-case support: support of various use-cases in form of raw visual inputs, conversation, inter-dependent behaviors, and etc.; 4) learning: system learn from both successful and failed cases; and 5) clean architecture: clear separation of code, i.e., between services and application level interaction and option to extend the existing strategies to define their own approach.

The present disclosure also discloses many advantages over previously available Apprentice agents. The advantages include but are not limited to: 1) learning strategies: multiple retrieval strategies based on the type of data (textual, image, conversational) that cover use-cases for sequential actions, raw visual inputs from human demonstrations, conversation among the entities; 2) adaptation: Several methods for adapting the cases such as model-based, rule-based, recursive based etc.; 3) self-diagnosis: Methods to introspect, self-diagnose, and learn by correcting its mistakes; 4) learning from just few set of demonstrations; and 5) human involvement: Involves human in the loop to facilitate continuous learning, and improvement and provides in-depth analysis to the human to understand the course of action taken so far.

The present disclosure solves one or more technical problems associated with traditional methods. The technical problems may include that, to solve a new problem in a new domain, a traditional agent may need significant modifications from a programmer. In addition, a significant amount of training data may need to be obtained by a programmer to train the traditional agent to learn how to solve a new problem in a new domain. These technical problems associated with traditional methods require significant extra time and resources. The present disclosure describes an AI agent learning from human demonstration. The present disclosure may solve the above drawbacks associated with traditional methods by transferring the burden of training from a programmer to the AI agent, and thus, decreasing the need for the programmer to spend a significant amount of time or effort in hand coding specific behaviors or actions for a new problem in a new domain.

The present disclosure is structured as follows: an electronic environment and a computer system for implementing an AI apprentice agent solution, an overall apprenticeship learning process, various components and embodiments of various components, the architecture, and description of a few exemplary case studies.

Electronic Environment and Computer System for Implementing an AI Apprentice Agent Learning Solution FIG. 1 shows an exemplary electronic communication environment 100 in which an AI apprentice agent learning solution may be implemented. The electronic communication environment 100 may include one or more apprenticeship learning engines 102 and 104, one or more user devices 112, 114, and 116 associated with users 120, 122, and 124, and one or more databases 118, in communication with each other via public or private communication networks 101.

The apprenticeship learning engines 102 and 104 may be implemented as a central server or a plurality of servers distributed in the communication networks. While the apprenticeship learning engines 102 and 104 are shown in FIG. 1 as implemented as separate servers, they may be alternatively combined in a single server or single group of distributed servers combining the apprenticeship learning functionality for processing the apprenticeship learning returned by the apprenticeship learning engine.

The user devices 112, 114, and 116 may be any form of mobile or fixed electronic devices including but not limited to desktop personal computers, laptop computers, tablets, mobile phones, personal digital assistants, and the like. The user devices 112, 114, and 116 may be installed with a user interface for accessing the apprenticeship learning engines. The one or more database 118 of FIG. 1 may be hosted in a central database server, a plurality of distributed database servers, or in cloud-based database hosts. The database 118 may be organized and implemented in any form, including but not limited to relational database containing data tables, graphic database containing nodes and relationships, and the like. The database 118 may be configured to store the cases for implementing apprenticeship learning process. The cases stored on the database 118 may include successful cases, but may also include failed cases as described below.

Figure 2:
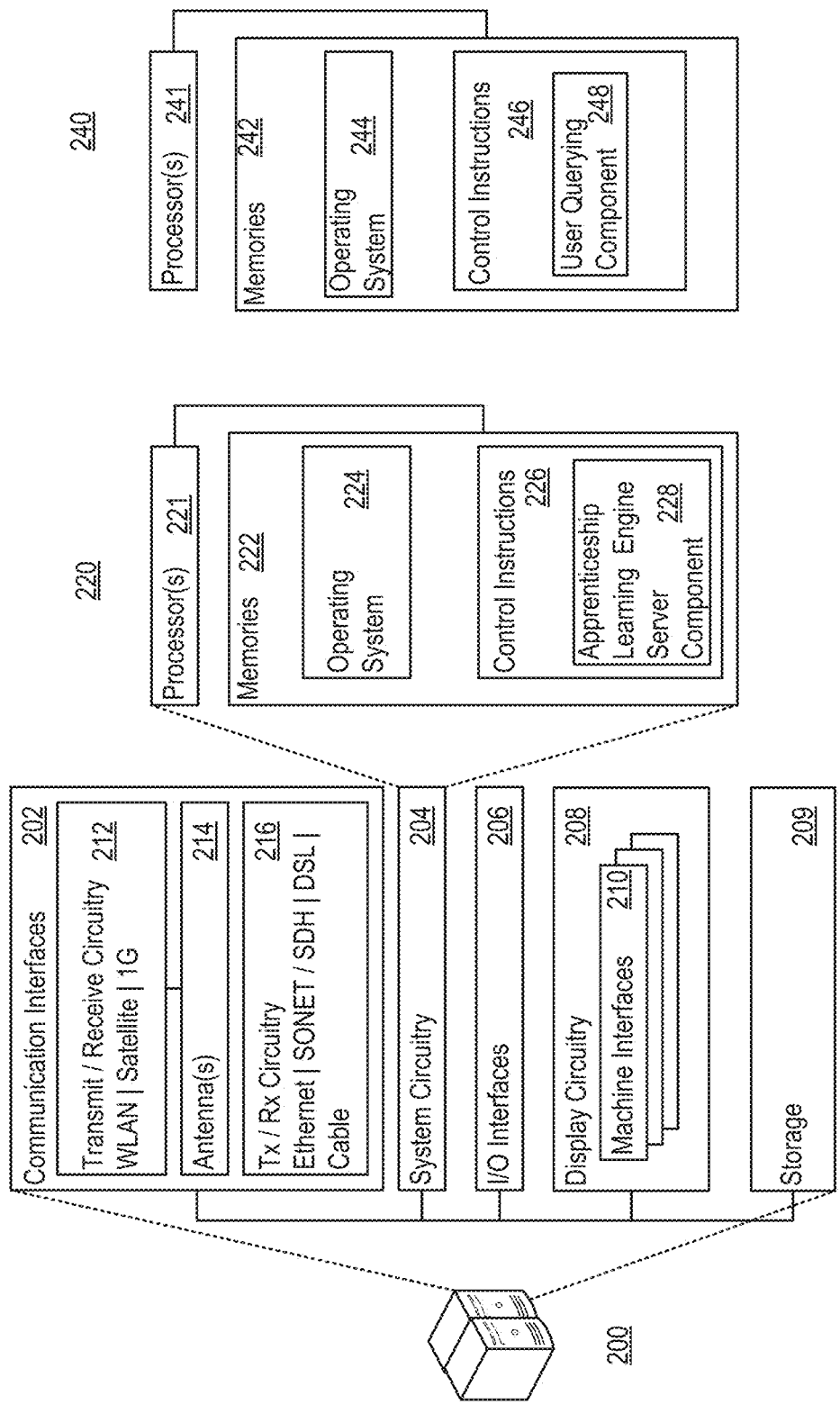
FIG. 2 shows computer systems that may be used to implement various components of the electronic communication environment of FIG. 1.

FIG. 2 shows an exemplary computer system 200 for implementing the apprenticeship learning engines 102 and 104, or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model for querying, searching, and for training an apprenticeship learning model. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, the system circuitry 204 may be implemented as 220 for the apprenticeship learning engines 102 and 104 of FIG. 1. The system circuitry 220 of the apprenticeship learning engines may include one or more instruction processors 221 and memories 222. The memories 222 stores, for example, control instructions 226 and an operating system 224. The control instructions 226, for example may include instructions for implementing the apprenticeship learning engine server component 228. In one implementation, the instruction processors 221 execute the control instructions 226 and the operating system 224 to carry out any desired functionality related to the apprenticeship learning engines.

Likewise, the system circuitry 204 may be implemented as 240 for the user devices 112, 114, and 116 of FIG. 1. The system circuitry 240 of the user devices may include one or more instruction processors 241 and memories 242. The memories 242 stores, for example, control instructions 246 and an operating system 244. The control instructions 246 for the user devices may include instructions for implementing a user querying component 248. In one implementation, the instruction processors 241 execute the control instructions 246 and the operating system 244 to carry out any desired functionality related to the user devices.

Apprenticeship Learning System

Figure 3:
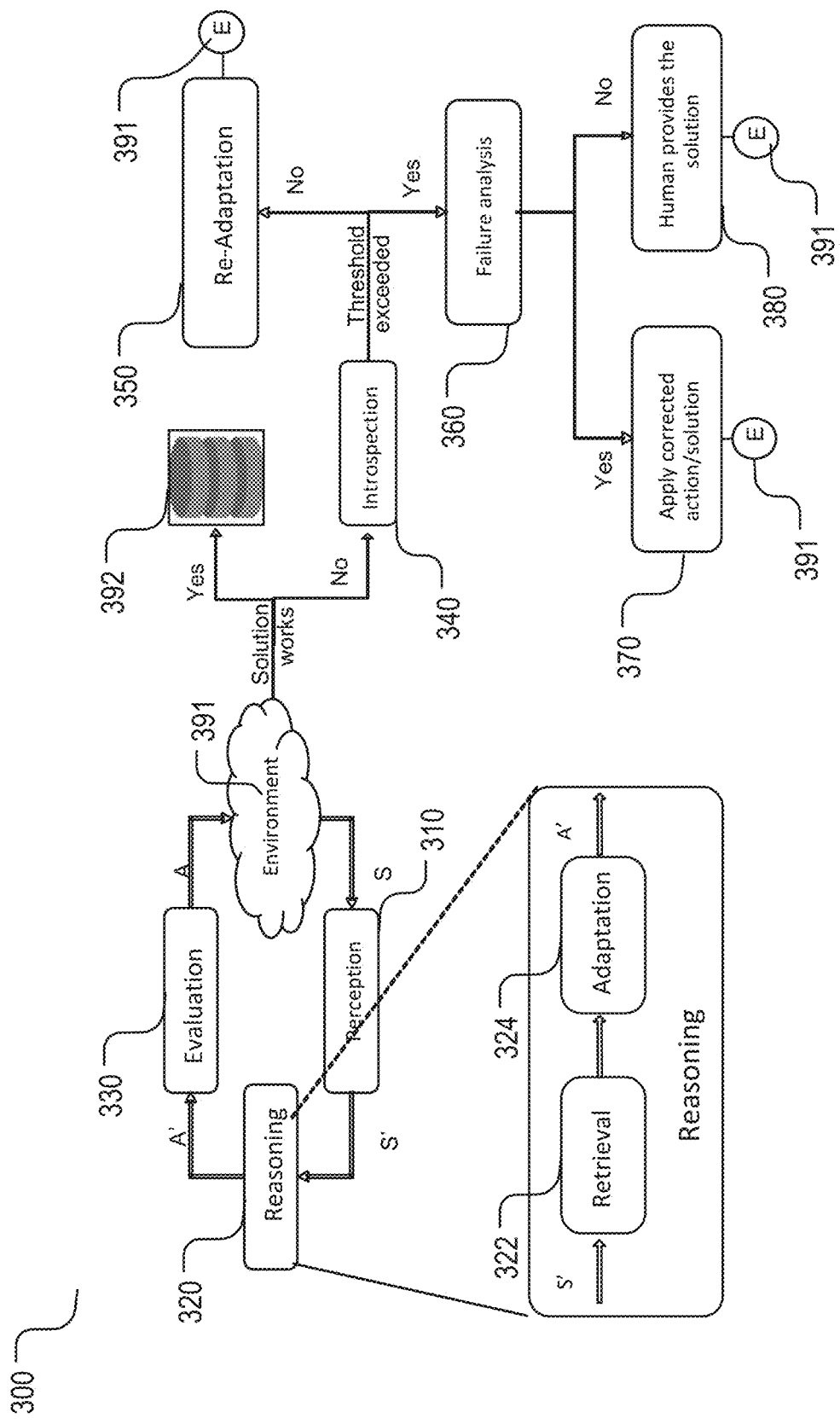
FIG. 3 shows a system for apprenticeship learning.

The present disclosure describes a system for apprenticeship learning, which may include a portion or all components as shown in FIG. 3. The system 300 may be an AI agent for computer-based recursive apprenticeship learning. The system for apprenticeship learning 300 may include a perception agent 310, a reasoning agent 320, an evaluation agent 330, an introspection agent 340, a re-adaptation agent 350, a failure analysis agent 360, an applying corrected action agent 370, and a human-provided action agent 380. The system 300 may also include an environment 391 and a database 392 storing cases.

The perception agent 310 may convert the raw sensory data of a new case into a form that is understood by the reasoning agent 320.

The reasoning agent 320 may include a retrieval sub-agent 322 and an adaptation sub-agent 324. The retrieval sub-agent 322 may extract/retrieve cases in the database that are similar to the new case. The adaptation sub-agent 324 may adapt the actions of the retrieved cases to the current input.

The evaluation agent 330 may apply actions on the environment and evaluate the outcome. When the action works, the new case may be saved into the database 391. When the action does not work, the new case may be sent to the introspection agent 340.

The introspection agent 340 may identify the important features for a successful evaluation.

The re-adaptation agent 350 may re-adapt the important features identified by the introspection agent 340, and then may apply the re-adapted actions on the environment and evaluate the outcome. When the outcome is not successful, the re-adaptation agent 350 may repeat the steps of re-adapting the important features, applying the re-adapted actions, and evaluating the outcome, until a threshold is reached.

When the threshold is reached and the outcome is still not successful, the failure analysis agent 360 may identify the category of failure pattern that the current failure belongs to, and find a cluster of cases comprising the failure category in the database.

When the failure analysis agent 360 may extract a corrected action from the cluster of cases, the system may send the new case to the applying corrected action agent 370. The applying corrected action agent 370 may apply the corrected action to the environment 391 and evaluating the outcome. When the outcome is successful, the applying corrected action agent 370 may store the new case in the database as a success case; and when the outcome is not successful, the applying corrected action agent 370 may store the new case in the database as a failure case.

When the failure analysis agent 360 does not extract a corrected action from the cluster of cases, the system may send the new case to the human-provided action agent 380. The human-provided action agent 380 may receive a human-provided action for the new case from a subject. The subject may be an expert in the field of the new case. The human-provided action agent 380 may apply the human-provided action to the environment 391 and evaluate the outcome. When the outcome is successful, the human-provided action agent 380 may store the new case in the database as a success case; and when the outcome is not successful, the human-provided action agent 380 may store the new case in the database as a failure case.

Architecture

Referring to FIG. 3, the present disclosure describes an architecture of a system 300 for apprenticeship learning. The system may initially observe and record the interactions between the human expert and the environment. For one implementation, the environment may include a computer game and the human expert may be a skilled gamer. The environment may further include various characters and their surroundings in the game. The system may observe and record moves and actions of the gamer to achieve one or more particular goals in the computer game. For another implementation, the environment may be a game of cricket and the human expert is a skilled cricket player. The environment may further include at least one of a wind speed, an air pressure, a grass humidity, field positions of other players, a ball speed, and a ball direction. The system may observe and record moves and actions of the skilled cricket player to achieve a particular goal in the game of cricket.

Each interaction may be recorded as a case with a case representation discussed below. The system is trained on these observed cases using the approach provided by the reasoning agent. When a new case that is similar to the recorded cases occurs, the system may propose the action corresponding to that input. As shown in FIG. 3, when the environment generates sensory input S, the perception agent 310 may convert the raw sensory data into a form (S') interpreted by the reasoning agent 320. The perception agent 310 may use feature representation techniques based on the input. The reasoning agent 320 may then use extracted input features S' to perform retrieval and adaptation. The retrieval sub-agent 322 may involve extracting the cases that are similar to the current case. The action corresponding to these retrieved cases may be directly applied on the environment, but, most of the time, the suggested action may not be perfectly suitable for the new input, i.e., parameters of the action might differ. To address this, the adaptation sub-agent 324 may adapt the parameters of the action (from the retrieved cases) based on the current input. The adapted action can then be used by the evaluation agent 330 to perform the action. If the applied action is able to achieve the goal, then the system may store the current input, action and the goal as a new case into the database, else, the system may enter into the Meta-reasoning phase. In this phase, the introspection agent 340 may introspect to find important parameters that effect the action's outcome and re-adapt these parameters. In case the solution still does not work, the failure analysis agent 360 may perform a failure pattern analysis to find out to which category of failure the current failed case belongs. If a corrected solution exists for this failed pattern, the applying corrected action agent 370 may apply the solution and evaluate it. If the outcome is still a failure, a human may be involved in the loop to provide the solution and when the human-provided action works, this is stored as a new case in the database. The entire activities of the system may be monitored so that human can observe it and then provide solution based on the trace captured.

Case Representation in Apprenticeship Learning System

Figure 4:
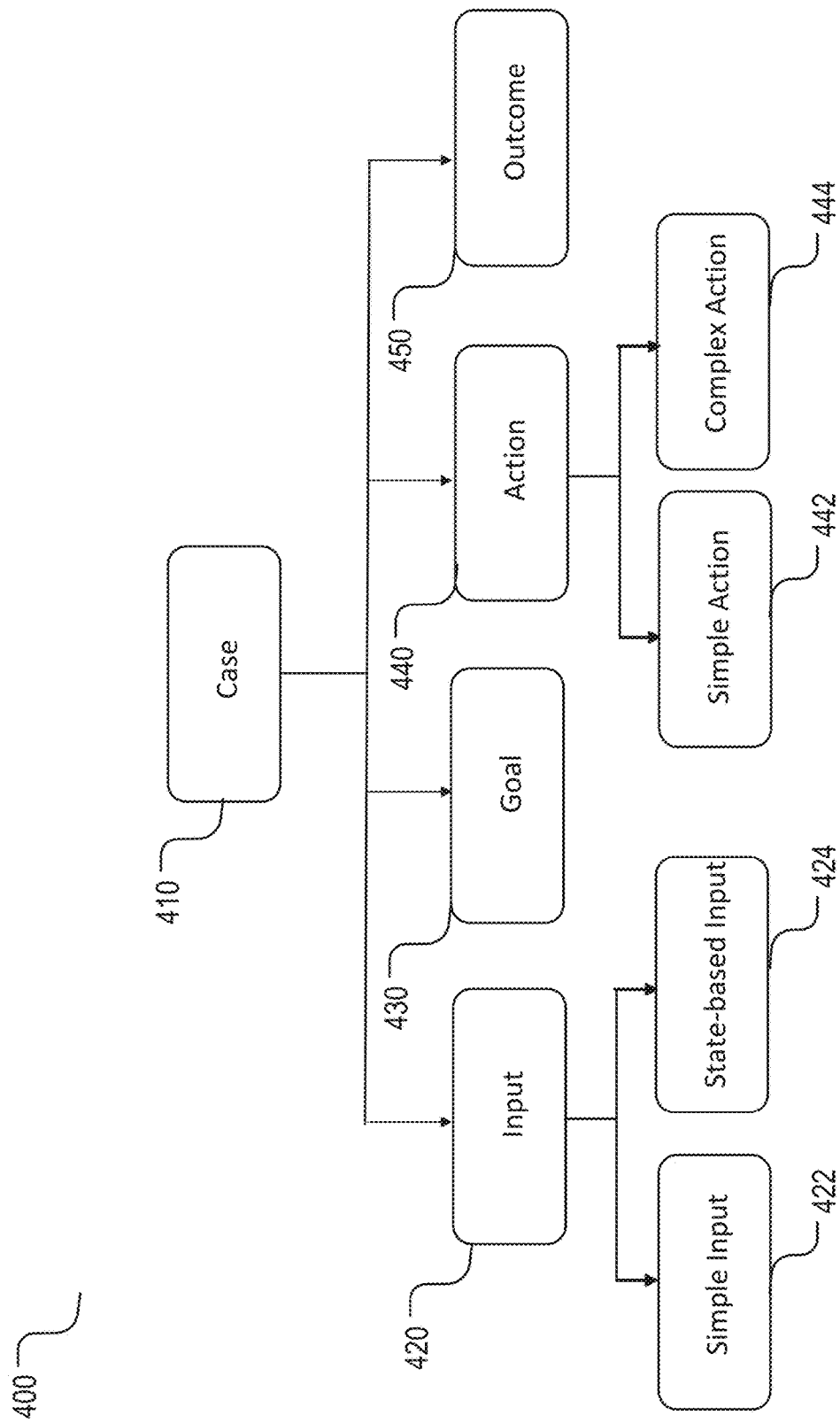
FIG. 4 shows an exemplary case representation in an apprenticeship learning system.

In the apprenticeship learning system, a case may represent a human expert demonstration or a new problem waiting to be solved. An AI agent that learns by human demonstration may act as an observer and watch the interactions between the expert and the environment. The observer may record the stimuli that the expert receives from the environment and the resulting actions that the expert performs. These observations may be recorded as a case that is further used to train the AI agent. The case representation 400 may contain the following components, as shown in FIG. 4. A case 410 may include one or more inputs 420, a goal 430, one or more actions 440, and an outcome 450. The term "case" used in the disclosure may correspond to a data-structure including parameters descriptive of inputs (e.g., a set of sensor data/inputs), a goal, an outcome flag, and a set of corresponding action parameters in response to the set of sensor data for achieving the goal. The sensor data/inputs may include any types of data/inputs, for example but not limited to, text, audio, video, air temperature, air pressure, environmental humidity, resistant force, a speed, lighting, a present status, and a position/layout of a present state. The term "a new case" used in the disclosure may correspond to a new input data-structure including sensor data (text, images and other data), action goal, and other data. The term "input feature parameters" used in the disclosure may correspond to an input feature vector of a predetermined dimension. The term "apprenticeship learning" used in the disclosure may correspond to a computer-based recursive learning. The term "cases stored in database" used in the disclosure may include historically validated data-structures stored in the database and/or historically failed data-structures stored in the database.

The one or more inputs 420 may represent a state of the environment. Inputs received by the AI agent can be of two types. Simple Input 422: Simple Input may depend only on the current environmental state of the system and may not be state-based input; and State-based Input 424: State-based Input may depend on the current state as well as the prior states of the system.

The goal 430 may represent an intended behavior or action of the expert/case. For every domain, goals are pre-defined.

The one or more actions may represent the intended behavior taken by the expert/case. Actions may include a simple action 442 if they represent a single action or a complex action 444 if they represent a set of actions. Complex actions may include parallel actions, sequential actions, or sub-actions. Each action may also have action parameters.

The Outcome 450 may be the result obtained from the evaluation of a case. The outcome may be either a Success or a Failure.

The present disclosure describes an exemplary embodiment with using the WARGUS game to understand the case representation. WARGUS is a real-time strategy game where each player's goal is to remain alive after destroying the rest of the players. Each player has a series of troops and buildings and gathers resources (gold, wood and oil) in order to produce more troops and buildings. WARGUS involves complex reasoning to determine where, when and which buildings and troops to build. The input of the game represents the current state of the game and opponents information, which includes total number of units built during the game, number of each resources (gold, wood and oil), total number of buildings possessed at current game cycle etc. The goals considered for the game are—(a) WinWargus: captures the intention of making the player win the game, (b) KillUnit: captures the intention of killing the unit and (c) SetupResourceInfrastructure: captures that the expert wanted to create a good resource infrastructure for player. The actions include building units (such as troops, buildings etc.), building resources etc.

Figure 5:
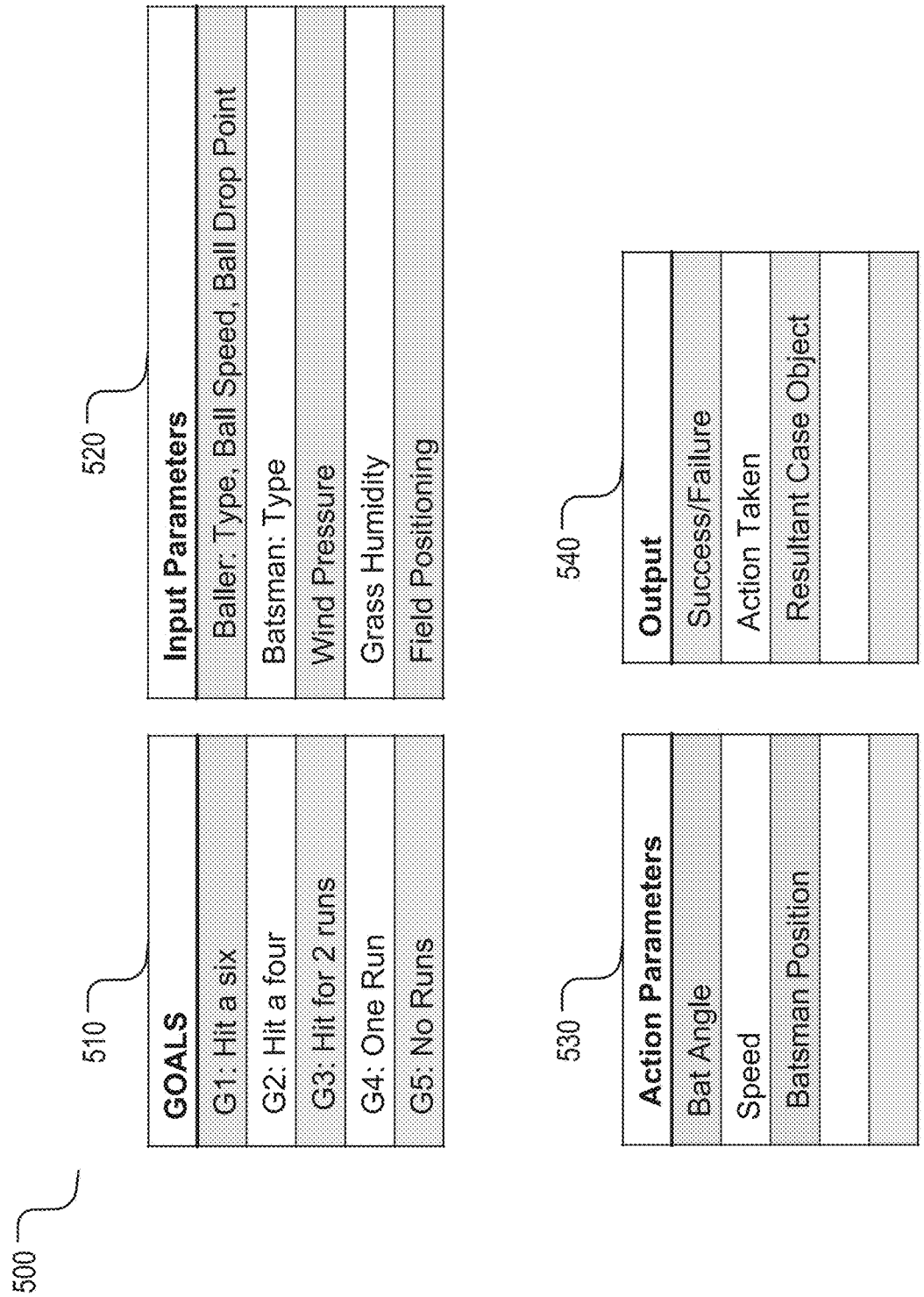
FIG. 5 shows an embodiment of case representation with a game of Cricket.

The present disclosure describes another exemplary embodiment with using a game of Cricket game to understand the case representation. The objective is to train the system to play the game of Cricket, and that apprentice is learning how to bat in a given condition to achieve a desired goal. The case may include a representation 500 as shown in FIG. 5. The case representation 500 may include one goal of a plurality of goals 510, one or more input parameters of a plurality of input parameters 520, one or more action parameters of a plurality of action parameters 530, and one or more output of a plurality of outputs 540. The case may be represented as, for example but not limited to, in FIG. 6, case 1 (610), case 2 (620), case 3 (630), and case 4 (640), listing in more detail the parameters for different cases for each goal.

Class Diagram of Case and Apprenticeship Learning System

Figure 7:
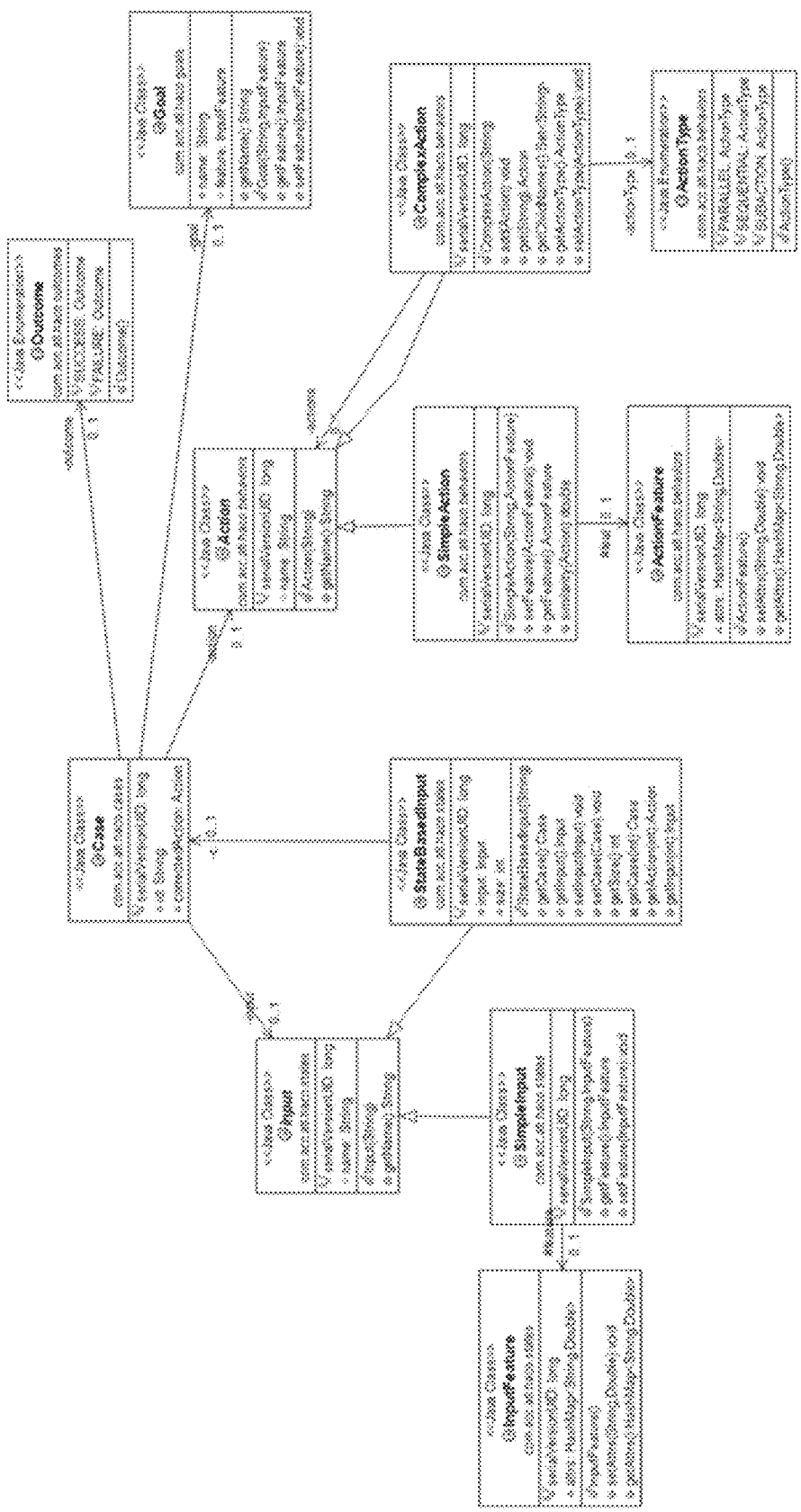
FIG. 7 shows a class diagram of case components.

A class diagram 700 of case components may be represented as shown in FIG. 7, showing one embodiment of an implementation of the relationships between different Java classes and Java enumerations.

Figure 8:
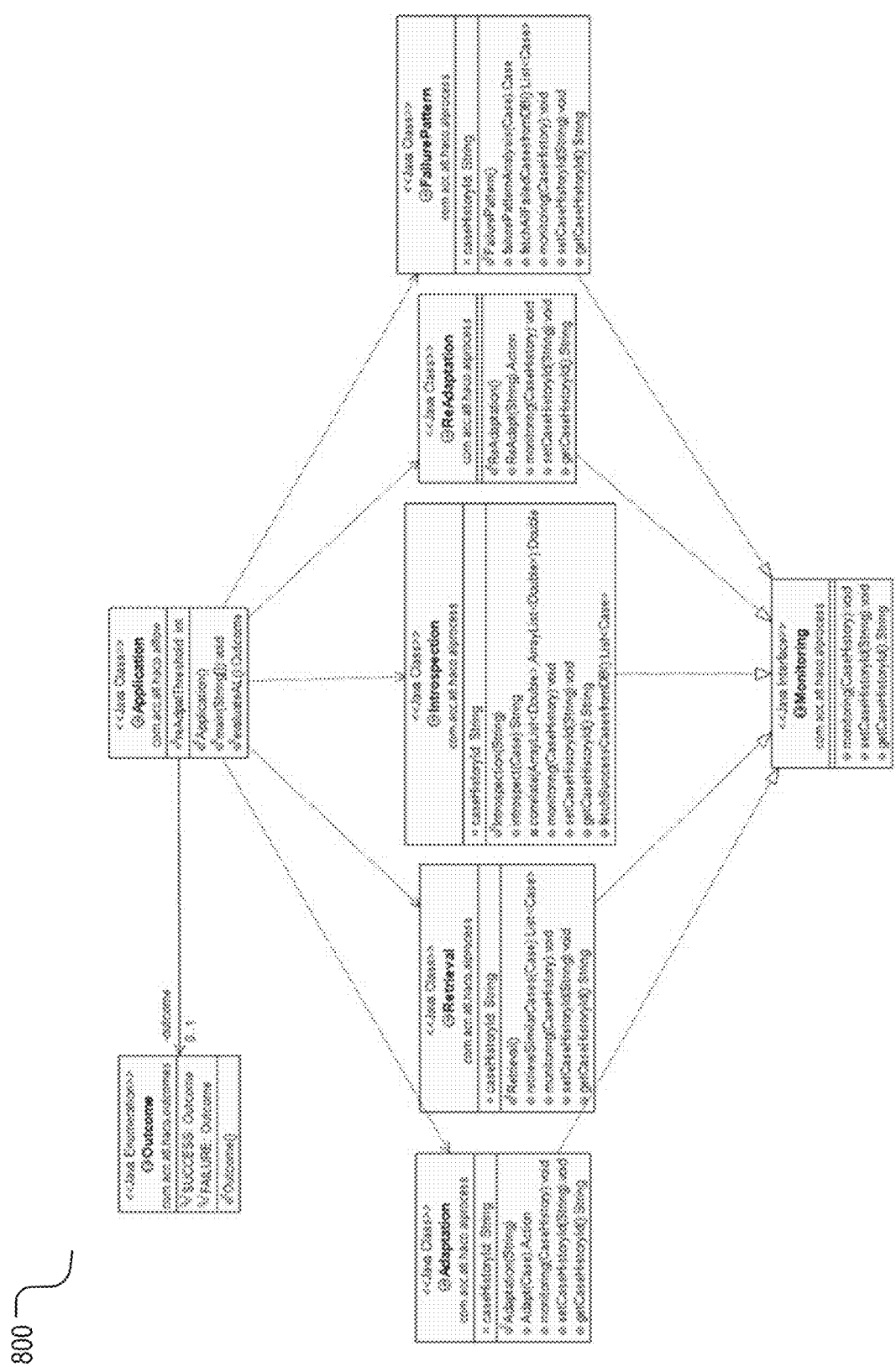
FIG. 8 shows a class diagram of components for apprenticeship learning.

A class diagram 800 of apprenticeship learning components may be represented as shown in FIG. 8, showing another embodiment of an implementation of the relationships between different Java classes a Java enumeration and Java interface.

Embodiment of Apprentice AI Training with a Game of Cricket

Figure 6:
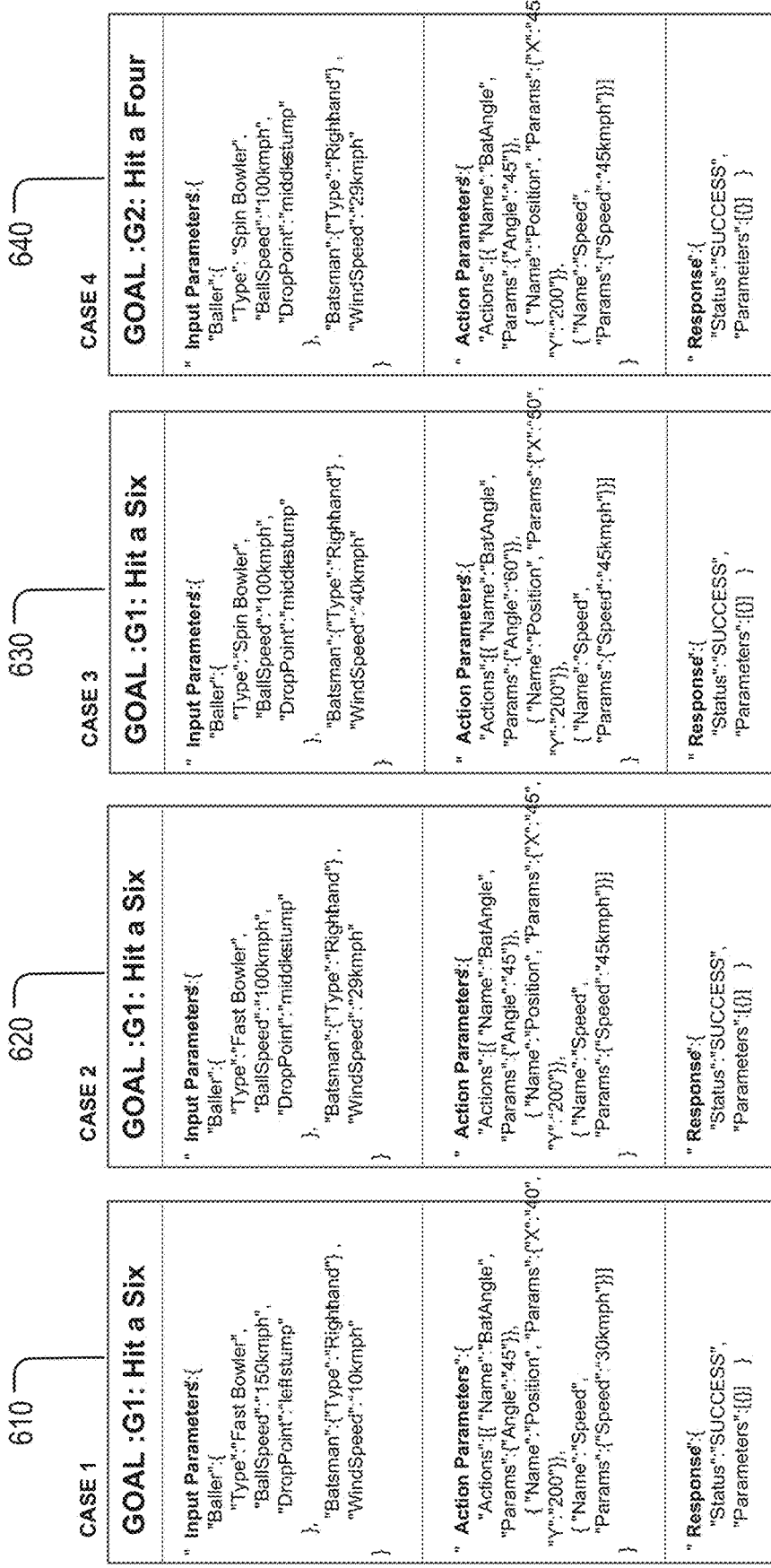
FIG. 6 shows case representations with a game of Cricket.

The present disclosure describes an exemplary embodiment of a system for apprenticeship learning with a game of Cricket. The database may store a plurality of cases, for example, the cases 610, 620, 630, and 640 as shown in FIG. 6.

Figure 9:
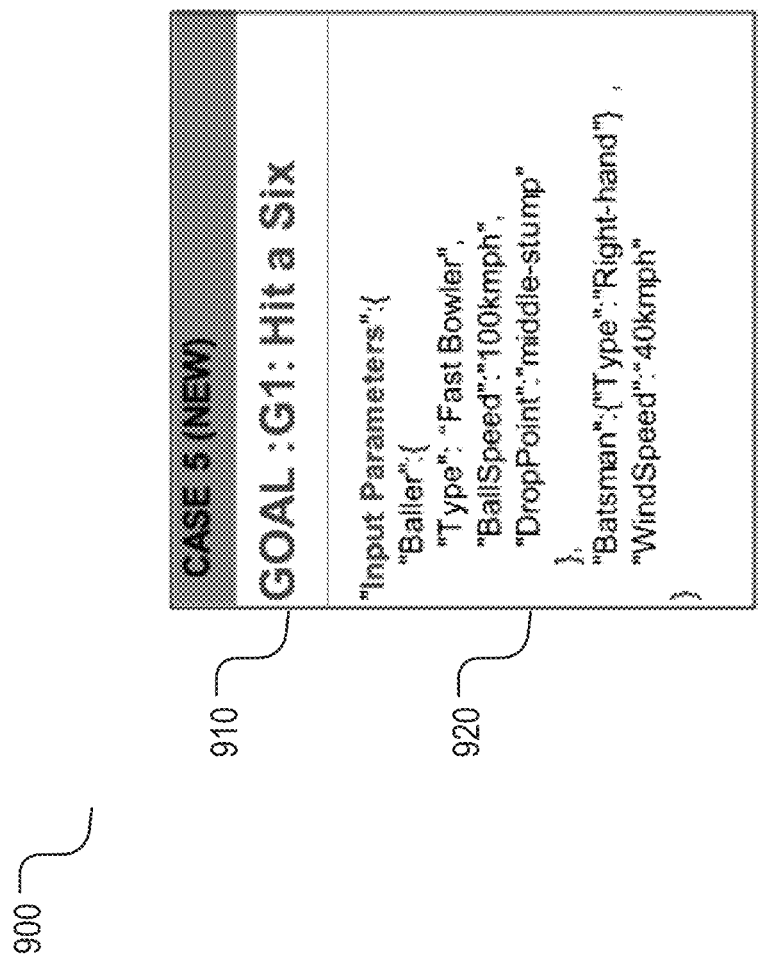
FIG. 9 shows a new case with a game of Cricket.

The system for apprenticeship learning with the game of Cricket may receive a new case. A perception agent of the system may convert raw inputs of the new case into one or more input feature parameters 920 of the new case 900 as shown in FIG. 9. The new case 900 may also include a goal 910.

Figure 10A:
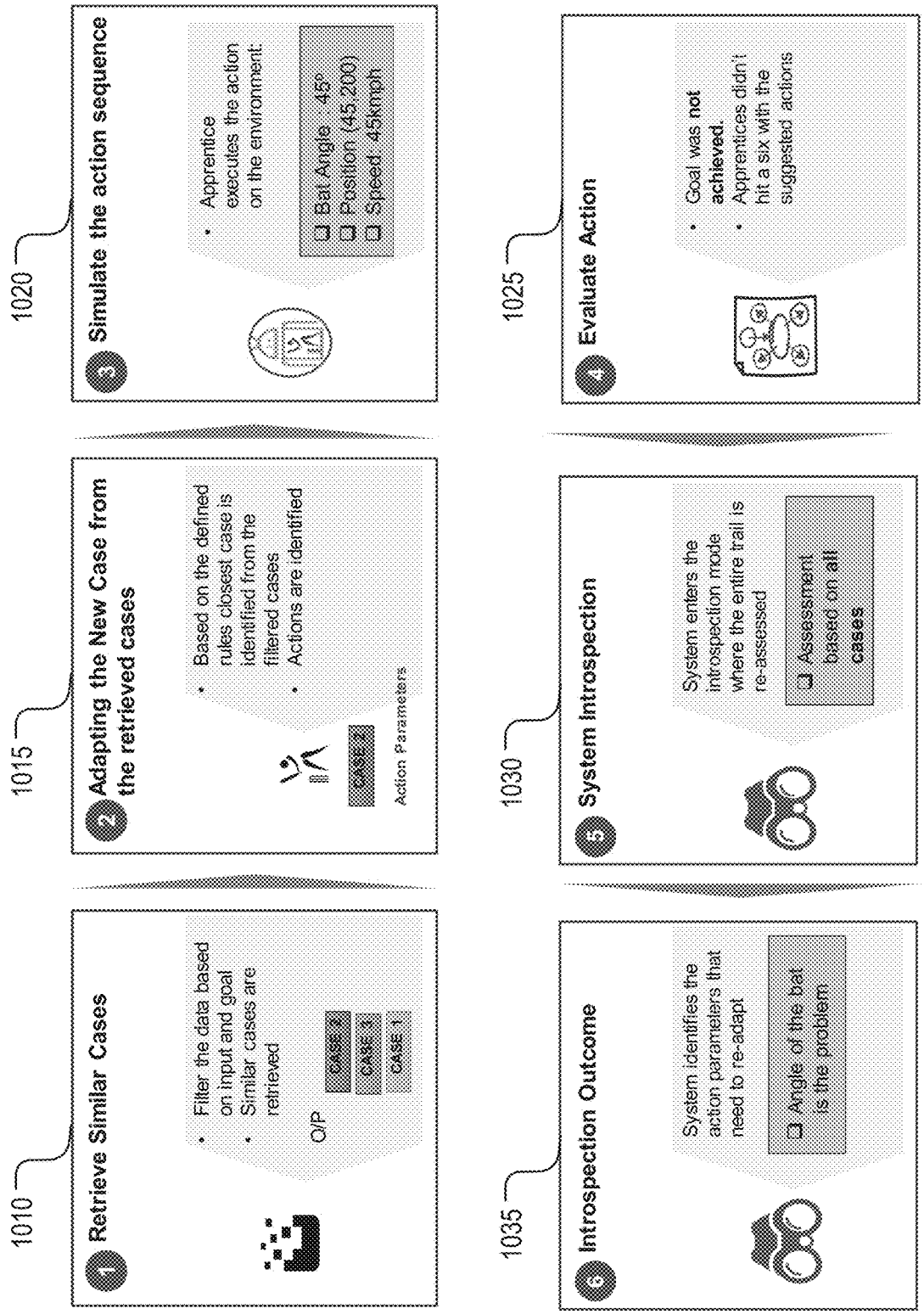
FIGS. 10A-10C show an apprentice AI training work flow with the game of Cricket.
Figure 10B:
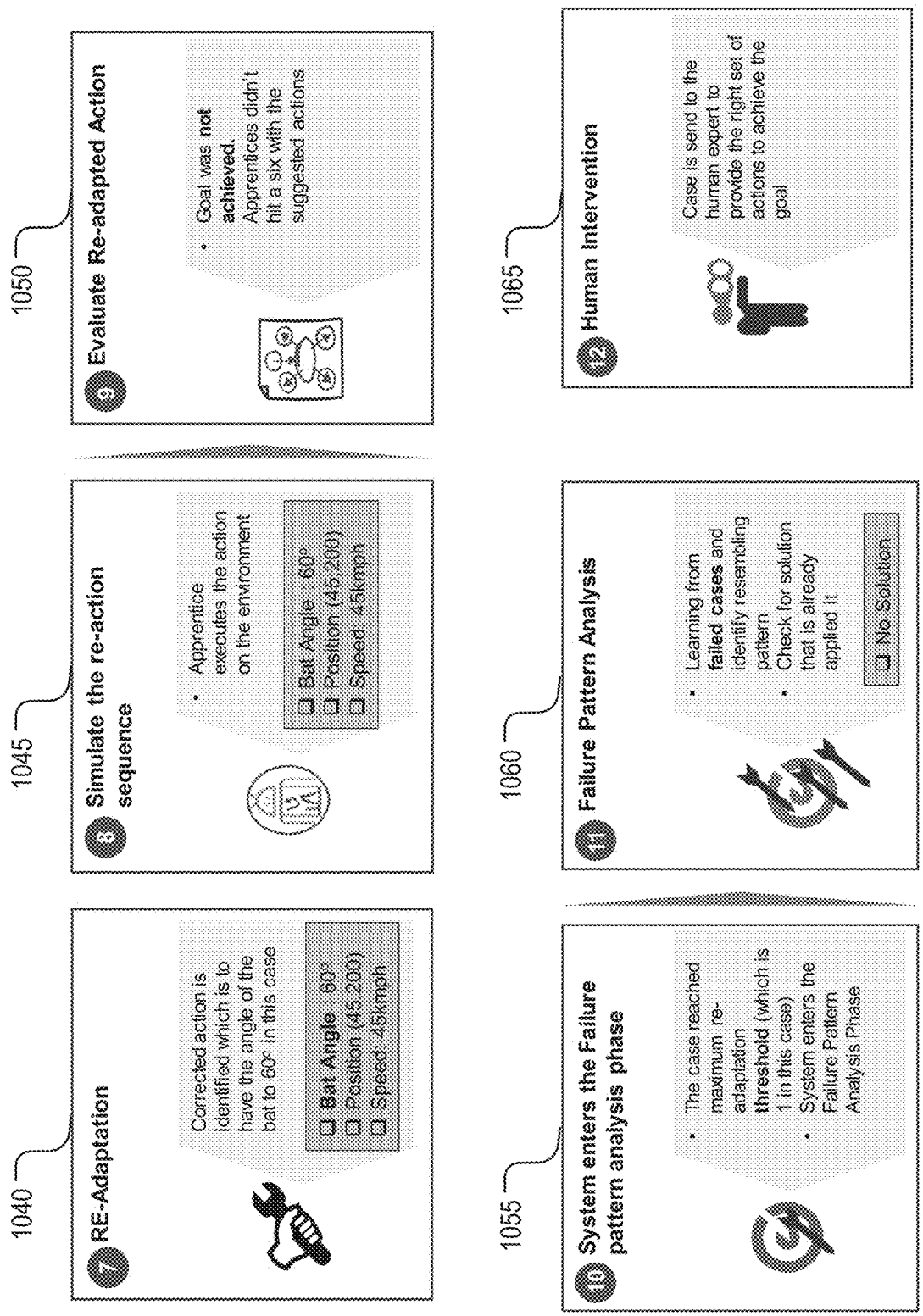
Figure 10C:
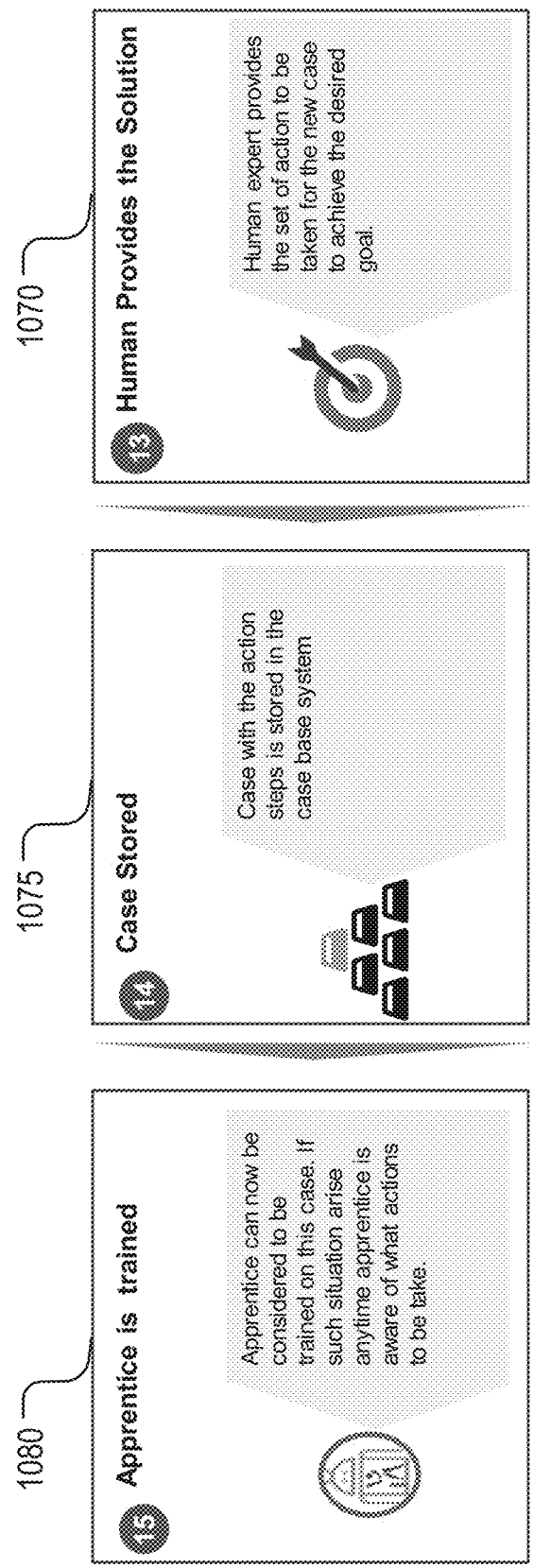

The apprentice AI training with the game of Cricket may include the following steps as shown in FIGS. 10A-10C.

Step 1010 may retrieve similar cases.

Step 1015 may adapt the new case from the retrieved cases.

Step 1020 may simulate the action sequence.

Step 1025 may evaluate action.

Step 1030 may perform a system introspection.

Step 1035 may introspect an outcome.

Step 1040 may re-adapt an action.

Step 1045 may simulate the re-adapted action or action sequence.

Step 1050 may evaluate the re-adapted action or action sequence.

Step 1055 may enter the failure pattern analysis phase.

Step 1060 may perform a failure pattern analysis.

Step 1065 may perform a human intervention.

Step 1070 may include that a human provides a solution, wherein a human expert provides a set of action to be taken for the new case to achieve the desired goal.

Step 1075 may store the case with the set of action steps in the case base system.

Step 1080 may include that the apprentice is considered to be trained. Thus, if such situation arise anytime, the apprentice is aware of what actions to be taken to achieve the desired goal.

Perception Agent

The present disclosure describes a perception agent in a system for apprenticeship learning, for example but not limited to, the perception agent 310 in the system 300 in FIG. 3.

The system may receive a new case having its sensory inputs from another server or from a set of sensors. The perception agent may convert such data into a form (based on the case representation shown in FIG. 4) so that a reasoning agent may process the same, for example but not limited to, the reasoning agent 320 in FIG. 3.

The inputs of the new case may be any one or a combination of raw visual inputs, conversation, inter-dependent behaviors, etc. To handle such inputs, the perception agent may include an automated Domain Independent Deep Feature Learning and several techniques in the apprenticeship learning system to handle different types of inputs.

The system may observe the human expert acting in the environment (i.e. performing its behavior or action) and record the inputs received by the expert, goals and the resulting actions. Consequently, each observation may create a case and be stored in a database. Over the course of observations, the system may collect these cases and may store them in the database. The observations may serve as labelled training data that the system can use to learn how to select actions in a similar manner (for similar input and goal) as the expert (i.e., what action to perform in response to a given visual input).

When the inputs of the new case belong to visual Inputs, the perception agent may include convolution neural networks (CNN) for feature representation without explicit model of its inputs i.e. it extracts the features directly from the raw visual input using the pre-trained VGG16 model. A pre-trained VGG16 model may be used as feature extractor. The pre-trained VGG16 model may contain an Input layer, five Convolution layers and five Pooling layers. The Convolution and Pooling layers of VGG16 model may be pre-trained on the ImageNet data. The fully connected layers (3 dense network) and the softmax loss layer may be trained using the collected observations received by sensory inputs.

The pre-trained layers may identify important visual features. This may alleviate the need to re-learn generic features by leveraging a pre-existing network. The system may also support training the model, rather than using pre-trained model, on the dataset to learn the feature representation. In one embodiment, the perception agent may be trained and evaluated on a dataset containing images of humans performing six different actions. For example, a publicly available image dataset may be used that contains 1538 images in total with 180-300 images per action class.

Figure 11:
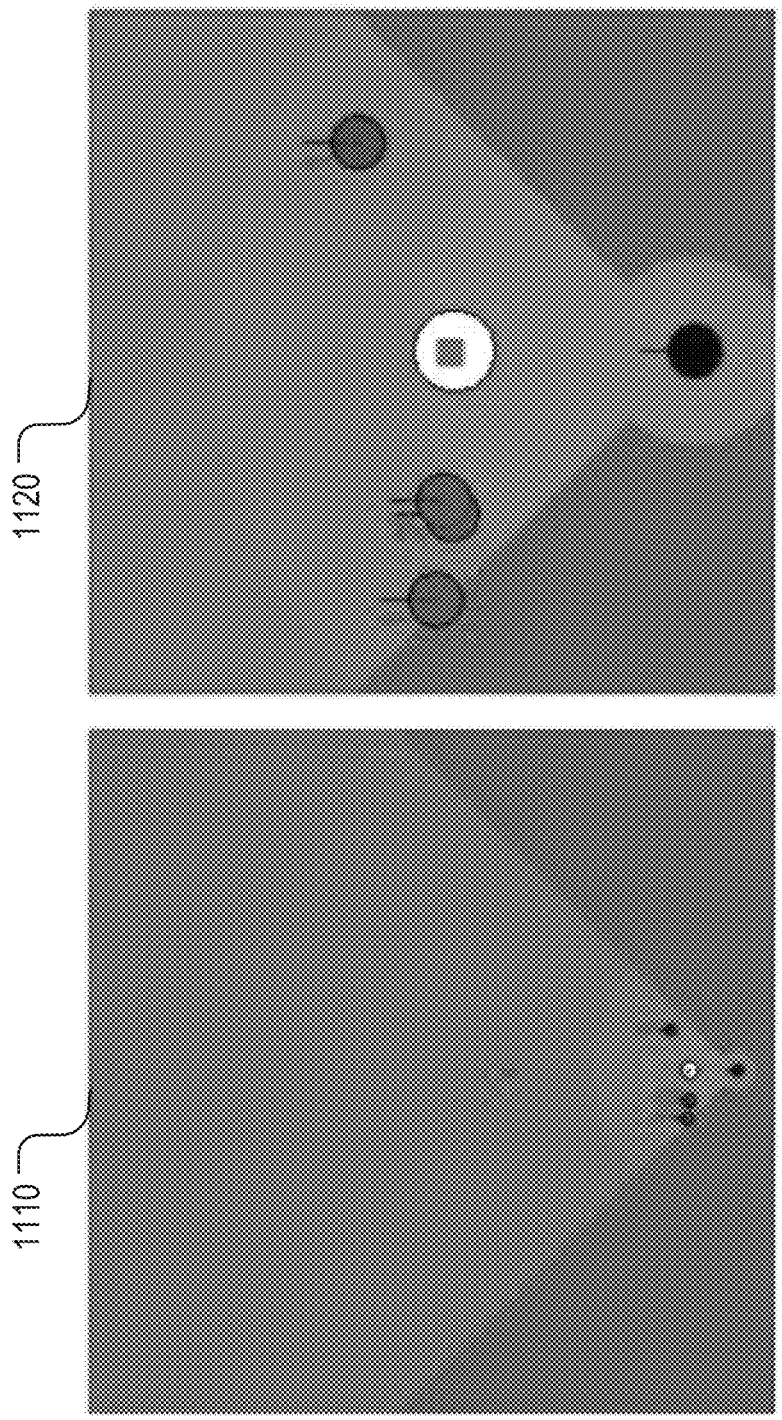
FIG. 11 shows an example of a full representation and a zoomed representation of a field in the game of Cricket.

The present disclosure describes another exemplary embodiment of the perception agent with a game of Cricket. The perception agent may include two deep learning (DL) models. The two DL models may be trained to handle different inputs. FIG. 11 shows an example of a full representation 1110 and a zoomed representation 1120 of a Cricket field or grounds in the game. The full representation 1110 may contain the player's entire field of vision, and the zoomed representation 1120 may contain an enlarged view of objects within a fixed-sized region surrounding the player. Therefore, one DL model is configured to process full visual inputs to actions, and the other DL model is configured to process the zoomed visual inputs to actions.

When the inputs of the new case belong to textual inputs, the perception agent may include a deep learning architecture that consists of embedding Layer and Convolutional Neural Network (CNN) Layer. The architecture may utilize an embedding layer that encodes the word into a dense real-valued vector and a Convolution Layer that is able to learn local response from temporal or spatial data to extract features. The CNN may be constructed on top of the pre-trained word vectors from textual data to learn feature representation.

For the Embedding Layer, word embedding techniques for learning word vector representations through neural language models may be applied, i.e. words or phrases from the vocabulary are mapped to vectors of real number. For example but not limited to, the publicly available "word2vec" vectors that were trained on 100 billion words from Google News may be used. The vectors may have a dimensionality of 300. The model may be trained using the continuous bag-of-words (CBOW) architecture. Words that are not present in the set of pre-trained words may be initialized randomly, and then the model may be allowed to learn the vectors during training. Optionally in another implementation, another set of publicly available "GloVe" word vectors trained on Wikipedia may be used. The "GloVe" vectors have a dimensionality of 300.

For the Convolution Layer, Convolution Neural Networks (CNNs) may be used for extracting and representing the features for both unstructured text and images. CNN models may have subsequently been shown to be effective for Natural Language Processing (NLP) and have achieved excellent results in semantic parsing, search query retrieval, sentence modeling, and other traditional NLP tasks. CNN may perform very well in extracting n-gram features at different positions of a sentence through filters, and may learn short and long-range relations through pooling operations. Max Pooling operation may be applied over the feature map and the maximum value may be taken as the feature corresponding to a particular filter. This may capture the most important feature (one with the maximum value) for each feature map. The model may use multiple filters (with varying filter sizes) to obtain multiple feature maps.

Reasoning Agent

The present disclosure describes a reasoning agent in a system for apprenticeship learning, for example but not limited to, the reasoning agent 320 in the system 300 in FIG. 3. The reasoning agent may include a retrieval sub-agent and an adaptation sub-agent.

In the retrieval phase, the reasoning agent may select a subset of cases from the database that are similar to the current new case. The reasoning agent may provide multiple strategies for retrieval based on the type of inputs of the new case.

When the inputs of the new case belong to simple inputs, the similarity between two cases may be determined using similarity-based approach or deep learning based classification approach.

When the inputs of the new case belong to state-based inputs, deep learning techniques may be used to predict the action to be taken based on the previous actions and/or previous cases.

In a similarity-based approach, a similarity may be computed between the input features of new case and the input features of all the existing cases in the database. For example but not limited to, the similarity-based approach may include K-Nearest Neighbor (KNN). The distance metrics may be any one or a combination of Equality, Euclidean Distance, Manhattan distance, Jaccard distance, and Cosine distance. The reasoning agent may choose the distance metrics for computing the similarity based on the type of inputs and the number of nearest neighbors "K". KNN algorithm may predict the action for a new case based on the similarity measure (e.g., distance metrics) computed between the current case and the existing cases in the database.

Figure 12:
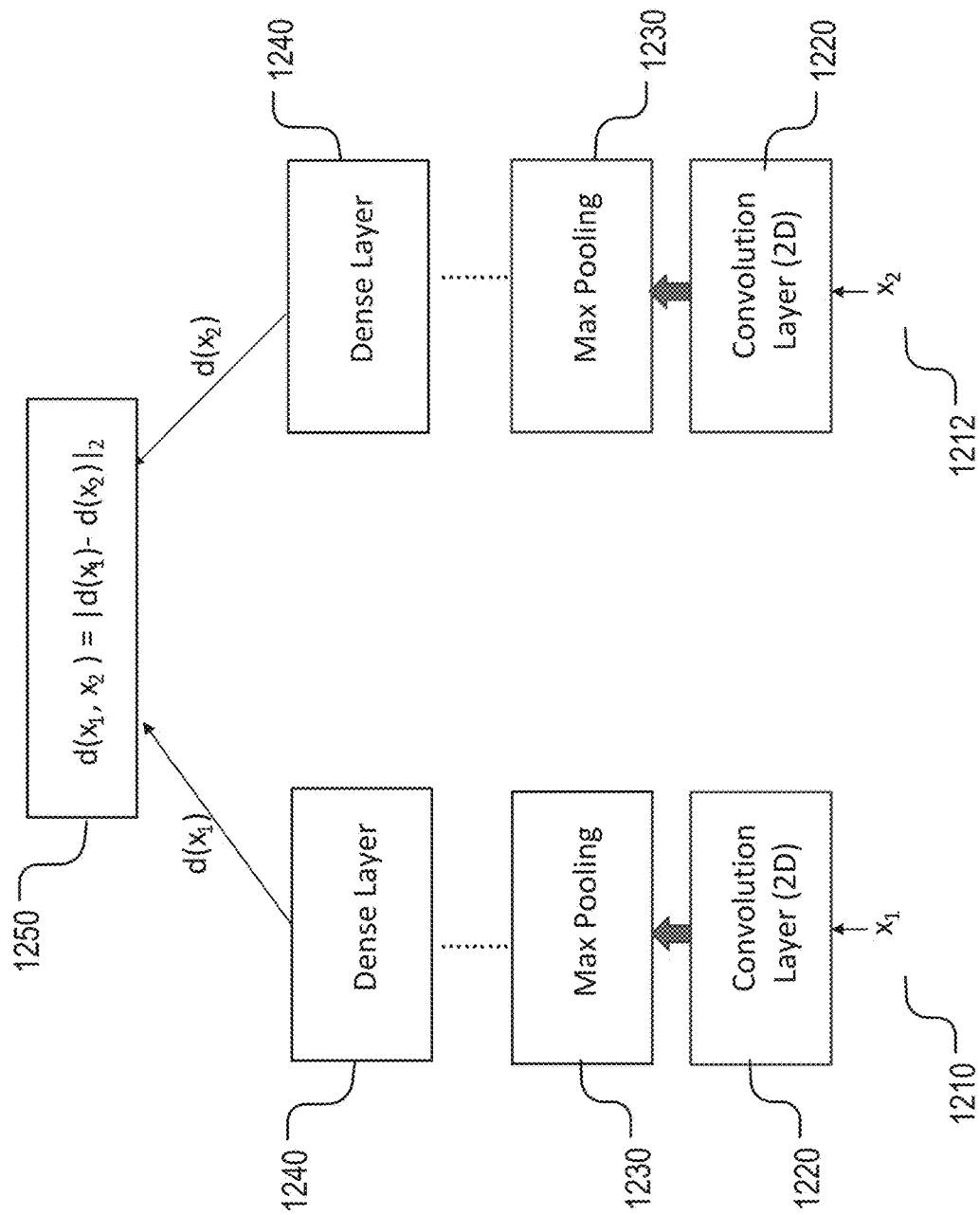
FIG. 12 shows one embodiment of a model for computing the similarity between two cases.

Referring to FIG. 12, the present disclosure describes an embodiment of a model for computing the similarity between two cases with two subnetworks using Siamese network model. The subnetwork in the Siamese network model may include at least one convolution layer, at least one max pooling layer, and at least one dense layer. The model may include a first input 1210 (x1) as input to the first subnetwork and a second input 1212 (x2) as input to the second subnetwork. Then, a value of the similarity between the first input and second input may be obtained.

The value of the similarity may be computed by the L2 norm in 1250 between the encodings of two sub-networks. The value calculated by $d(x1, x2)=|d(x1)-d(x2)|_2$ in 1250 may correspond to distance information between the two cases x1 and x2. When the distance information between the two cases x1 and x2 is small, the two cases x1 and x2 may be similar, so that one case may be used to as a similar case to predict actions for another case. When the distance information between the two cases x1 and x2 is large, the two cases x1 and x2 may be dissimilar so that one case may not be used as a similar case to predict actions for another case.

The Siamese network model may include two identical sub-networks having the same parameters and weights. Each sub-network may include a convolution layer 1220, a max pooling layer 1230, and a dense layer 1240. A triple loss function may be used to learn the network parameters in order to get good encodings. For example, the loss function may be $d(A,P)+\mu \leq d(A,N)$.

Figure 13:
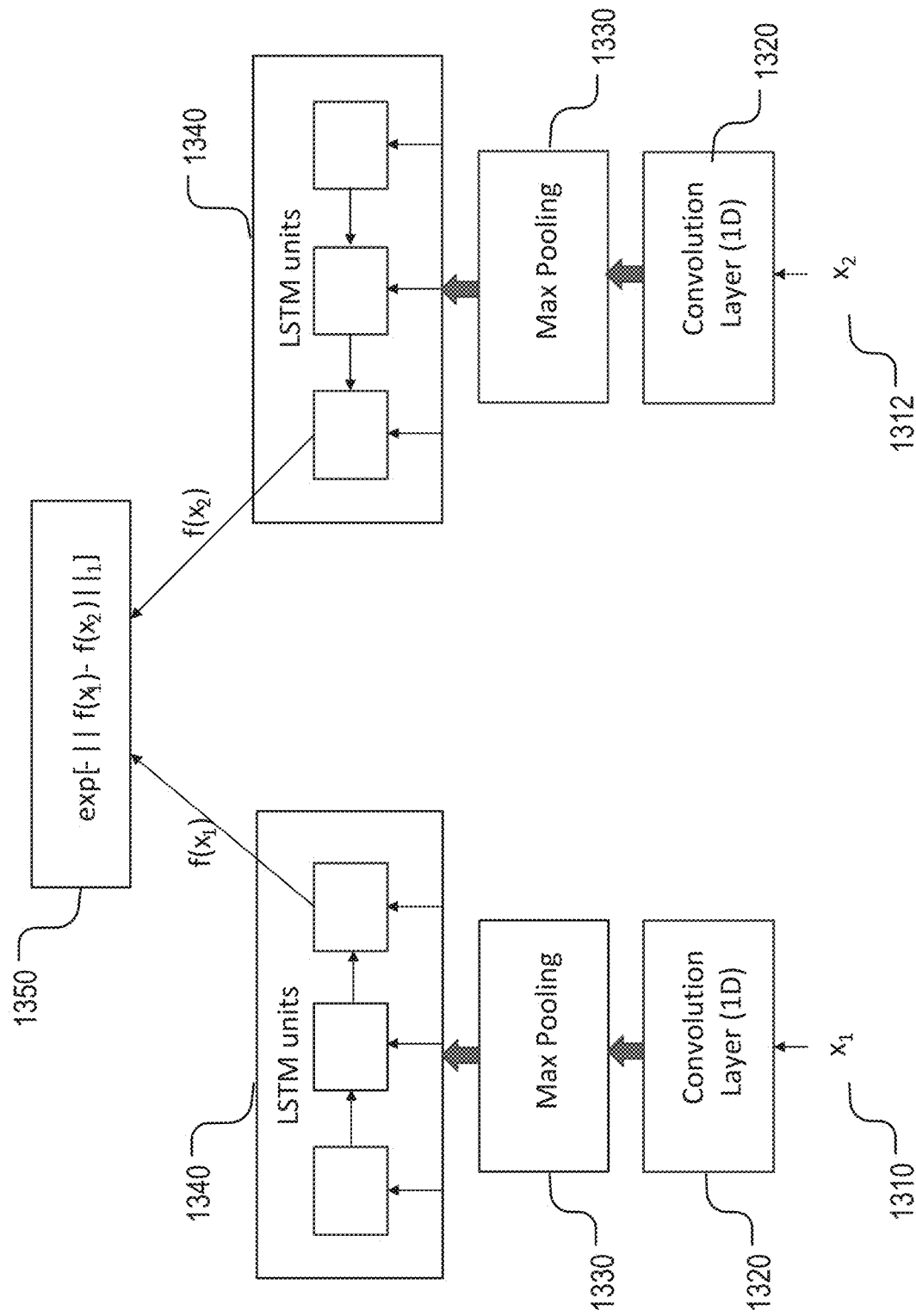
FIG. 13 shows an embodiment of another model for computing the similarity between two cases.

Referring to FIG. 13, the present disclosure describes another embodiment of another model for computing the similarity between two cases with two subnetworks. The subnetwork may include at least one convolution layer, at least one max-pooling layer, and at least one layer of long short-term memory (LSTM) units. The model may include a first input 1310 (x1) and a second input 1312 (x2), and may output a value of the similarity between the first input and second input. The value of the similarity may be computed by the L1 norm in 1350 between the encodings of two sub-networks. The value of L1 norm may lie between zero and 1.

The model may include two identical sub-networks having same parameters and weights. Each sub-network may include a convolution layer 1320, a max-pooling layer 1330, and a layer of long short-term memory (LSTM) units 1340. In one implementation, the max-pooling layer is optional. In case of time-series input, the convolution layer 1320 and max pooling layer 1330 may be removed.

The value of the similarity may be computed by the equation in 1350 between the encodings of two sub-networks. The value calculated by $d(x1, x2)=\exp(-\|f(x1)-f(x2)\|_1)$ in 1350 may correspond to similarity information between the two cases x1 and x2. When the similarity information between the two cases x1 and x2 is large, the two cases x1 and x2 may be similar, so that one case may be used to as a similar case to predict actions for another case. When the similarity information between the two cases x1 and x2 is small, the two cases x1 and x2 may be dissimilar so that one case may not be used as a similar case to predict actions for another In a deep learning based classification approach, a Multi-Layer Perceptron (MLP) (also called feed-forward neural network) classification model may be trained to predict the actions. The input features extracted by the perception agent and the goal of the new case may be the inputs and action as label for the training model. The MLP classification model may consist of an input layer, six hidden layers and an output layer. MLP may be a supervised algorithm that learns a non-linear function for classification. It may utilize a back-propagation technique to optimize the weights so that the neural network can learn to map arbitrary inputs to outputs during training. The predicted output of the network may be compared to the expected output and an error may be calculated. The error may be then back propagated through the network, one layer at a time, and the weights may be up-dated according to the amount contributed to the error. Dropout regularization technique may be used to prevent neural networks from overfitting. This is a technique where randomly selected neurons within the network are ignored while training the model. The dropout may be applied after each hidden layer. The rectified linear unit (ReLU) activation function may be applied to all the hidden layers. Activation functions may convert an input signal of node to an output signal and introduce non-linear properties to neural network. The trained model may predict the action for the new case.

For state-based inputs, prior actions and inputs may also be considered to predict the next action. The reasoning agent may be modeled as a sequential classification problem and deep learning based approach may be applied where the inputs are passed as a sequence to Long Short Term Memory (LSTM) layer and then output layer predicts the action with sigmoid activation function. LSTM layer is capable of handling sequences of any length and captures long-term dependencies. LSTM propagates historical information via a chain-like neural network architecture. While processing sequential data, it looks at the current input as well as the previous output of hidden state at each time step to predict the action.

For state-based inputs, the present disclosure describes one embodiment of a window model to predict actions for sequential actions. For state-based inputs, a window may be recent time steps that are used to make the prediction of the action for the new case. The size of the window may be a parameter that can be tuned for each individual problem. The window model may be solved as a sequential classification problem, and the data may be represented as G1-(A1→A5→A7) and G2-(A3→A9→A4→A8). A deep learning based sequential learning approach may be used to predict the actions for the new case based on at least one of the goal, the state, and the prior actions. In the window model, inputs may be passed as a sequence to LSTM layer and then the output layer may predict the action with sigmoid activation function. In one implementation, a window model may be applied and evaluated on a synthetic dataset that takes the predicted action of the previous instance as a previous action for current instance.

For state-based inputs, the present disclosure describes another embodiment of a human activity recognition model to predict actions for sequential actions. Given a sequences of actions, an objective of the human activity recognition model is to predict a generic action, for example but not limited to, (A1→A5→A7)→A' and (A3→A9→A4→A8)→A". The instance may be classified into a generic action using recurrent neural networks (RNN) with bi-directional LSTMs. In the human activity recognition model, inputs may be passed as a sequence to LSTM layer and then the output layer may predict the action with sigmoid activation function. In one implementation, a human activity recognition model may be applied and evaluated on a dataset that contains the sensor values (for example, accelerometer and gyroscope) and the type of the activity performed by the user.

Figure 14:
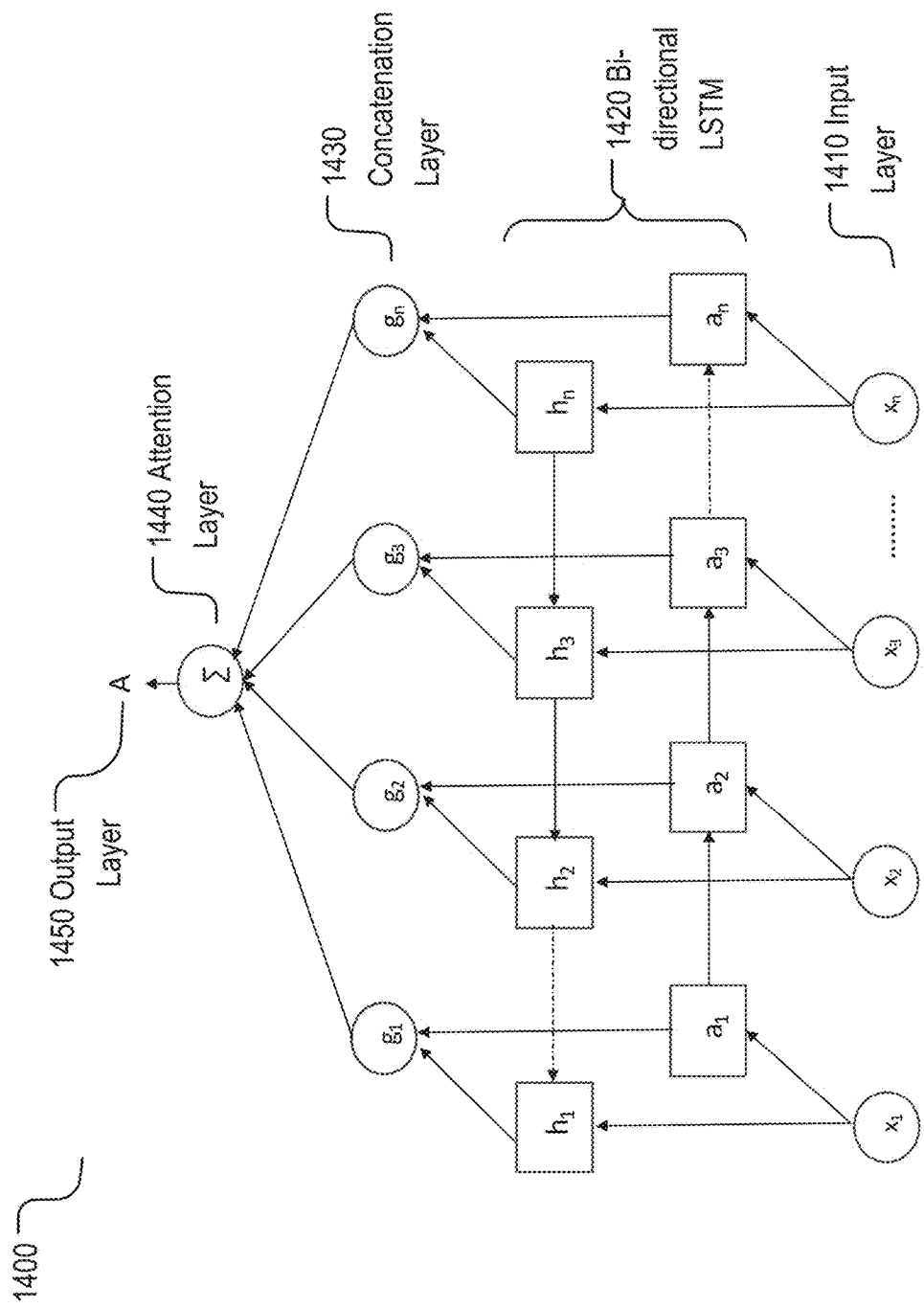
FIG. 14 shows another embodiment of a human activity recognition model.

FIG. 14 shows another embodiment of a human activity recognition model 1400. The human activity recognition model 1400 may include an input layer 1410, a bi-directional LSTM layer 1420, an attention layer 1440, and an output layer 1450.

The input layer 1410 may include a plurality of inputs, x1, x2, . . . , and xn. When the inputs of the cases are sequence of frames in form of images, these frames may be pre-processed through a perception agent.

The bi-directional LSTM layer 1420 may be used to capture the sequence. The outputs of the forward and backward pass (a1, a2, . . . an; and h1, h2, . . . , hn) in the bi-directional layer may be concatenated by a concatenation layer 1430 before passing to the attention layer 1440. In another implementation, the concatenation layer 1430 may be a summation layer performing a summation of the outputs of the bi-directional layer, or an average layer performing an average of the outputs of the bi-directional layer.

The attention layer 1440 may weight the input based on their corresponding significance in output predictions. In one implementation, sensory device may obtain sensory values in response to actions of a subject, for example, image sequences or video clips. The system may predict a particular activity of the subject. For example, when an action of running is predicted, g1 and g2 in the concatenation layer may be more important than other elements in the concatenation layer (e.g., g3, g4, . . . gn), so that g1 and g2 may correspond to a larger weight parameter than other elements in the concatenation layer. For another example, when an action of walking is predicted, g3 may be more important than other elements in the concatenation layer (e.g., g1, g2, g4, . . . , gn), so that g3 may have a larger weight parameter than other elements in the concatenation layer.

The result of the Retrieval process may be a case that contains an action that achieves a goal similar to the new case, and that may be applied to a similar environment than the current one. In one implementation, the action may be parameterized, i.e., action contains action parameters. The action contained in the retrieved case then may go through the adaptation process because the current state of the environment might be slightly different from the retrieved one. Adaptation phase may adapt the solution of the case selected in the retrieval stage to the current problem. The system provides the option to adapt the action parameters based on the current state. The adaptation sub-agent for performing adaptation may be selected as an option for the system for apprenticeship learning.

The adaptation sub-agent may adapt the parameters corresponding to the action based on an adaptation strategy, for example but not limited to, a model-based strategy, a rule-based strategy, a recursive-based strategy, and a combination of the above strategy.

In the model-based strategy, a machine learning or a deep learning model may be trained to adapt the parameters of the action based on the input features. The parameters of the action can be categorical or numerical. Depending upon the action parameters types, the system may provide several machine learning algorithms (regression and classification techniques) to train the model for predicting the action parameters. In one implementation, based on the number of action parameters, separate machine learning model may be trained.

In the rule-based strategy, the adaptation sub-agent may include an option to define rules in the following semantic forms: 1) Event-Condition-Action (ECA) with a typical form of IF-THEN-ELSE, and conditions of ECA may be defined based on their domain; and 2) Association rules helping uncover relationships between seemingly unrelated elements/variables present in the database. The existing cases present in the database may be used in the Apriori algorithm to generate rules that can be further used to adapt the parameters. Depending on system consideration during adaptation, the system for apprenticeship learning may also include custom-defined rules.

In the recursive-based strategy, the problem or the structure of the problem may be complex. Thus, it may be unlikely that the complete solution of the retrieved case can be directly applied to the current problem. This may mean that the retrieved case may contain sub-solutions. It may be necessary to adapt these sub-solutions. In this approach, it may be possible to sub-divide the arising problems and the related solutions into independent sub-problems and related sub-solutions. This may mean that the complete problems can be solved only if all included sub-problems are solved and combined into an overall solution. If the unsolved problem is an atomic problem, atomic solutions to them may be provided. To adapt these solutions, the adaptation sub-agent may modify the parameters of the provided actions. When solving unsolved problems with state-based inputs, the adaptation sub-agent may repeat the above described procedure in a recursive manner. The basic idea of Recursive Adaptation may be described as the principle of "Divide and Conquer". To obtain a solution for the overall complex problem, it may be necessary to combine all found sub-solutions.

Evaluation Agent

The present disclosure describes an evaluation agent in a system for apprenticeship learning, for example but not limited to, the evaluation agent 330 in the system 300 in FIG. 3. The evaluation agent may include an execution sub-agent and an assessment sub-agent.

The evaluation agent may involve applying the action on the environment and evaluating the outcome. The parameters for evaluation may be decided by the system based on the domain of the problem. Based on the outcome, the system decides to either store the new case into the database or perform self-diagnosis.

The execution sub-agent may perform a mapping between the actions that are understood by the reasoning agent and the actual actions. In a simulated domain, the execution sub-agent may involve converting the action into a message that would be sent to the simulation server. In a physical domain, the execution sub-agent may involve causing a robot to perform the action. In a virtual domain, the execution sub-agent may involve performing at least one specific step by computer. The virtual domain may include but not limited to, a computer game, a procedure learning process, and a procedure training process.

The approach of the execution sub-agent may include a control algorithm as described in Algorithm 1.

| Algorithm 1 Control algorithm |
| --- |
| 1: procedure CONTROL(Action a)<br>2:   if (a.name == "UP") then<br>3:     send("moveUp")<br>4:   else send("moveDown") |

After the action is applied on the environment, the assessment sub-agent may assess a result in the environment, and evaluate whether a difference between the result and the goal of the new case is within a threshold. The threshold may be a value specific to the new case, wherein the system considers any difference of the outcome smaller than the threshold may be insignificant and may be ignored. When the difference between the result and the goal of the new case is within the threshold, the assessment sub-agent may determine that the action for the new case generates the goal of the new case. When the difference between the result and the goal of the new case is not within the threshold, the assessment sub-agent may determine that the action for the new case does not generate the goal of the new case.

Introspection Agent

The present disclosure describes an introspection agent in a system for apprenticeship learning, for example but not limited to, the introspection agent 340 in the system 300 in FIG. 3. When the outcome of the evaluation agent is not successful, the introspection agent may perform a self-diagnosis. The introspection agent may perform self-diagnosis and provide feedback in real-time right after the evaluation agent determines a failed outcome. When real-time self-diagnosis and feedback is not practical, for example, a real-time strategy game, the introspection agent may either save the current environmental conditions and perform the self-diagnosis at a later time; or perform the self-diagnosis at a background.

When the outcome is not successful, the introspection agent may identify one or more important features of the actions for the new case. Thus, the introspection agent may obtain the name of the action and its features that are to be changed for a successful action. The identified features by the introspection agent may be sent to a re-adaptation agent for re-adaptation.

The introspection agent may find the important features for a successful evaluation by correlating outcome and feature values. The features having a strong correlation with a successful outcome may be identified as important features. The approach of the introspection agent may be described in Algorithm 2.

| Algorithm 2 Introspection algorithm |
| --- |
| 1: procedure INTROSPECTION(Trace trace, Case c, Threshold t)<br>2:  count = 0<br>3:  feature = difference(expected, observed)   ▷ obtain the features based on correlation with outcome etc.<br>4:  while (count != t) do<br>5:    Adaptation.adapt(feature) ▷ Adapt based on a feature<br>6:    if (evaluation == true) then<br>7:      cb.store(c)<br>8:    else FailurePatternAnalysis(trace, cb, c) |

Re-Adaptation Agent

The present disclosure describes a re-adaptation agent in a system for apprenticeship learning, for example but not limited to, the re-adaptation agent 350 in the system 300 in FIG. 3.

The re-adaptation agent may re-adapt the one or more important features of the action to obtain a re-adapted action for the new case. The re-adapted action may be sent to evaluation agent for evaluation and assessment.

When the outcome is not successful, the re-adaption agent may repeat the re-adaptation one more time. The re-adaptation agent may include a repetition counter and a repetition condition to limit the number of repeating the re-adaptation process. For example but not limited to, the repetition counter may be initially set as one and increase by one for every repeat of the re-adaptation process; and the repetition condition may be "smaller than 5". In this implementation, the re-adaptation process may repeat five times, and then may send the failed case to a failure analysis agent for further process.

During the re-adaptation process, when the outcome is successful, the suitable action is identified for the new case and the re-adaptation process may be terminated.

In one implementation, the re-adaptation agent may include a model and/or an algorithm similar or the same to the adaptation sub-agent of the reasoning agent as discussed above.

Failure Analysis Agent

The present disclosure describes a failure analysis agent in a system for apprenticeship learning, for example but not limited to, the failure analysis agent 360 in the system 300 in FIG. 3.

The failure analysis agent may identify a failure pattern of the failed case, may identify a failure category of the failure pattern that the current failed case belongs to, and then may find a cluster of cases in the same failure category in the database.

In one implementation, the failure analysis agent may extract a corrected action from the cluster of the cases in the database, and then send the corrected action to an applying corrected action agent.

In another implementation, when the failure analysis agent may not identify a cluster of cases in the same failure category or may not extract a corrected action from the cluster of the cases, the failure analysis agent may send the new case to a human-provided action agent.

The system may store successful cases in the database, and may also store failed cases in the database. A failed case may occur under various circumstances, for example but not limited to, when the system behaves in an unexpected way, i.e., when a particular goal is not achieved by applying a predicted action. A failure pattern may capture the behavior of such failed cases and stores the description of the anomalous situation that has occurred. The failed case may be represented as: (a) Input: the input that was passed from the environment, (b) Action: the action that was taken, (c) Goal: the goal for which the action was performed, and (d) Corrected Action: a modified action might be stored if human was involved and provided the action.

The failure analysis agent may identify the category of failure pattern to which the current failed case belongs. To achieve this, the failure analysis agent may initially cluster all the cases based on the input and goal. The failure analysis agent may include a plurality of methods of clustering from the available algorithms, and a user of the system may select a particular method provided by the system based on the specific problem. The clustering algorithms include but are not limited to K-Means, Expectation-Maximization, Mean-Shift, and Agglomerative Hierarchical Clustering. For instance, when the failure analysis agent uses K-Means algorithm to perform clustering of the cases based on input and goal, the clusters are formed based on feature similarity where the features are the input and goal. Next, the failure analysis agent may find the cluster (from the identified set of clusters) that is closest to the current problem and use the corrected action (if exists) and store it as a corrected action for the current case. The approach is described in Algorithm 3.

Algorithm 3 Failure Pattern Analysis algorithm

```
1:  procedure FAILUREPATTERNANALYSIS(Trace trace, Case c)
2:     KMeans clusters = new KMeans( )
3:     KMeans.buildClusterer(trace.cb, c.Input, c.Goal)
4:     if (c.Input == clusters[i].Input && c.Goal ==
       clusters[i].Goal) then
5:        c.correctedAction = cluster[i].Action
6:     if (evaluation == true) then
7:        cb.store(c)
8:     trace' = Monitoring(c)
9:     return trace'
```

Applying Corrected Action Agent

The present disclosure describes an applying corrected action agent in a system for apprenticeship learning, for example but not limited to, the applying corrected action agent 370 in the system 300 in FIG. 3.

The applying corrected action agent may receive the corrected action from a failure analysis agent, and then apply the corrected action to the environment 391 and evaluate the outcome. When the outcome is successful, the applying corrected action agent may store the new case in the database as a success case; and when the outcome is not successful, store the new case in the database as a failure case.

Human-Provided Action Agent

The present disclosure describes a human-provided action agent in a system for apprenticeship learning, for example but not limited to, the human-provided action agent 380 in the system 300 in FIG. 3. Beyond background learning, the system for apprenticeship learning may escalate questions/problems/cases the system cannot answer to a human, and observe how the questions/problems/cases are solved. The system may provide the summary of what has been done, that is, until that point in time or state, so that the human may perform the right action. Then, the human may perform the action, i.e., provide the solution to the failed case. This solution may be evaluated and stored into the database and incremental learning is performed.

After the human-provided action agent receives the failed case from a failure analysis agent, the human-provided action agent may receive a human-provided action for the failed case from a subject. The subject may be an expert in the field of the new case. The human-provided action agent may further apply the human-provided action to the environment and evaluating the outcome.

Human-provided action agent may provide a solution and perform an action, and then its outcome may be evaluated in real-time or may be evaluated next time when a similar case or a similar environment appears. When the outcome is successful, the human-provided action agent may store the new case in the database as a success case; and when the outcome is not successful, the human-provided action agent may store the new case in the database as a failure case.

Embodiments and System Evaluation

The present disclosure describes embodiments and system evaluations. Applications are developed to assess the effectiveness of the system. These applications demonstrate how the system may be utilized to develop systems for apprenticeship learning.

Embodiment with WARGUS Game

The present disclosure describes an embodiment with WARGUS AI agent to evaluate the system. The WARGUS AI agent has used the WARGUS game (aka Warcraft™ II modification) dataset for evaluation that was collected during a human expert playing the game. The data attributes may be represented as shown in FIG. 15, which includes an attribute table 1500 with a feature column 1510 and a description column 1520. The WARGUS dataset that consists of 3200 cases from 27 games is generated as a result of human expert playing the game. Every action taken by human expert for corresponding environmental inputs (game attributes) is represented as a case. The data contains 30 game attributes (numerical and categorical type), 3 goals and 4 actions. The actions of WARGUS game dataset were parameterized. The WARGUS AI agent selected "Deep Learning based MLP approach" as Retrieval strategy and "Model-based" Adaptive approach. The dataset was split into Train-Validation-Test set (80%-10%-10%). To evaluate the retrieval sub-agent of the system, Accuracy and F-measure were used as metrics, and Accuracy as 0.93 and F-measure as 0.89 were observed.

Embodiment with Human Action Prediction

The present disclosure describes another embodiment with a human action prediction agent to evaluate the system. The human action prediction agent was tested on the video dataset provided by KTH Royal Institute of Technology (see www.nada.kth.se/cvap/actions/). The dataset contains images of humans performing six different actions. There are 1538 images in total with 180-300 images per action class. The human action prediction agent may leverage the technique provided by a perception agent for feature representation of visual input. Then, these input features are passed to a reasoning agent for a training classification model. The effectiveness of classification model was validated. The dataset was split into Train-Validation-Test set (80%-10%-10%). Accuracy and F-measure were used as evaluation metrics for classification model, and Accuracy as 0.962 and F-measure as 0.918 were observed.

In the above two embodiments to evaluate the system, the system provides developers with the strategies for training the agents/system. The developers may not need to take care of feature representation. The present disclosure demonstrates the development and evaluation of two embodiments of apprentice AI agents.

The technical components provided by these implementations include various numerical representation transformations, various convolutional neural networks, various recurrent neural networks, and the multilayer perceptron neural networks. The technical solution further includes the novel arrangement of these neural networks in a hierarchical and cascading manner, and in a combination of word and character level representations and feature extraction. The technical solution further provides a cross-channel pooling in additional to intra-map pooling of feature maps in the convolutional neural network to extract both global and local correlations in a dataset.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A system for computer-based recursive learning, the system comprising:
   a database for storing historically validated data-structures wherein each historical data-structure comprises a goal, a set of sensor data, and a set of corresponding action parameters in response to the set of sensor data for achieving the goal of the historical data-structure;
   a memory for storing a computer-based recursive e-learning model comprising:
      a perception agent,
      a reasoning agent, and
      an evaluation agent; and
   system circuitry in communication with the database and the memory, wherein the system circuitry is configured to:
      receive an input data-structure comprising one or more sensor inputs and a goal of the input data-structure,
      convert, using the perception agent, the one or more sensor inputs of the input data-structure into an input feature vector of a predetermined dimension,
      obtain, using the reasoning agent, a predicted action corresponding to the input feature vector and the goal of the input data-structure based on the historically validated data-structures,
      determine, using the evaluation agent, whether the predicted action simulatively produces the goal of the input data-structure, and
      when it is determined that the predicted action simulatively produces the goal of the input data-structure, store the input data-structure and the predicted action in the database as part of the historically validated data-structures.

2. The system according to claim 1, wherein:
   the reasoning agent comprises a retrieval sub-agent and an adaptation sub-agent; and
   when the system circuitry is configured to obtain, using the reasoning agent, the predicted action, the system circuitry is configured to:
      retrieve, using the retrieval sub-agent, an action for the input data-structure corresponding to the input feature vector and the goal of the input data-structure based on the historically validated data-structures, and
      adapt, using the adaptation sub-agent, the retrieved action for the input data-structure to obtain an adapted action as the predicted action for the input data-structure.

3. The system according to claim 2, wherein, when the system circuitry is configured to retrieve the action for the input data-structure corresponding to the input feature vector and the goal of the input data-structure based on the historically validated data-structures, the system circuitry is configured to:
   determine, using the retrieval sub-agent, whether the one or more sensor inputs belong to a non-state-based input category; and
   when it is determined that the one or more sensor inputs belong to the non-state-based input category,
      compute, using the retrieval sub-agent, a similarity between the input feature vector and the goal of the input data-structure and corresponding input feature vector and goals of the historically validated data-structures stored in the database, obtain, using the retrieval sub-agent, one or more candidate data-structures from the database with their highest values of similarity, and retrieve, using the retrieval sub-agent, the retrieved action for the input data-structure based on actions of the one or more candidate data-structures from the database.

4. The system according to claim 3, wherein:

the retrieval sub-agent computes the similarity between two data-structures based on a K-Nearest Neighbor (KNN) model; and the KNN model comprises a distance metrics configured to compute distance functions, wherein the distance metrics may comprises at least one of Equality, Euclidean Distance, Manhattan distance, Jaccard distance, or Cosine distance.

5. The system according to claim 2, wherein, when the system circuitry is configured to retrieve the action for the input data-structure corresponding to the input feature vector and the goal of the input data-structure based on the historically validated data-structures, the system circuitry is configured to:

determine, using the retrieval sub-agent, whether the one or more sensor inputs belong to a non-state-based input category;

when it is determined that the one or more sensor inputs belong to the non-state-based input category, retrieve, using the retrieval sub-agent, the action for the input data-structure corresponding to the input feature vector and the goal of the input data-structure based on the historically validated data-structures; and wherein the retrieval sub-agent comprises a supervised algorithm configured to learn a non-linear function for classification based on a deep learning approach.

6. The system according to claim 5, wherein:

the retrieval sub-agent comprises a Multilayer Perceptron (MLP) classification model.

7. The system according to claim 2, wherein, when the system circuitry is configured to retrieve the action for the input data-structure corresponding to the input feature vector and the goal of the input data-structure based on the historically validated data-structures, the system circuitry is configured to:

determine, using the retrieval sub-agent, whether the one or more sensor inputs belong to a state-based input category; and when it is determined that the one or more sensor inputs belong to the state-based input category, retrieve, by the retrieval sub-agent, the retrieved action for the input data-structure corresponding to the input feature vector and the goal of the input data-structure based on the historically validated data-structures.

8. The system according to claim 7, wherein the retrieval sub-agent retrieves the retrieved action for the input data-structure using a window model;

the window model comprises a deep learning based sequential learning approach and a Long Short Term Memory (LSTM) layer to predict the retrieved action;

the window model comprises a window size N, N being an integer larger than 1; and the retrieval sub-agent is configured to:
pass the input feature vector as a sequence to the LSTM layer, and
retrieve the retrieved action based on the input data-structure, (N−1) previous actions, and the historically validated data-structures stored in the database.

9. The system according to claim 7, wherein the retrieval sub-agent retrieves the retrieved action for the input data-structure using a human activity recognition model;

the human activity recognition model comprises a Recurrent Neural Network (RNN) with bi-directional Long Short-Term Memory cells (LSTMs) to predict the retrieved action; and the retrieval sub-agent is configured to:
pass the input feature vector as a sequence to the bi-directional LSTMs, and
retrieve the retrieved action based on the input data-structure, one or more previous actions, and the historically validated data-structures stored in the database.

10. The system according to claim 2, wherein, when the system circuitry is configured to adapt, using the adaptation sub-agent, the retrieved action for the input data-structure to obtain the adapted action as the predicted action for the input data-structure, the system circuitry is configured to:

obtain, using the adaptation sub-agent, action parameters of the retrieved action; and adapt, using the adaptation sub-agent, one or more action parameters of the action parameters to obtain the adapted action.

11. The system according to claim 2, wherein, the adaptation sub-agent comprises at least one of:
a machine learning model comprising at least one of a regression technique or a classification technique;
a rule-based model comprising at least one of an Event-Condition-Action (ECA) semantic form or association rules; or
a recursive-based model configured to sub-divide the input data-structure into one or more sub-data-structures.

12. The system according to claim 1, wherein, the evaluation agent comprises an execution sub-agent and an assessment sub-agent; and when the system circuitry is configured to determine, using the evaluation agent, whether the predicted action simulatively produces the goal of the input data-structure, the system circuitry is configured to:
map, by the execution sub-agent, the predicted action into an executable action in an environment;
execute, by the execution sub-agent, the executable action in the environment;
assess, by the assessment sub-agent, a result in the environment produced by executing the executable action;
evaluate, by the assessment sub-agent, whether a difference between the result and the goal of the input data-structure is within a threshold;
when the difference between the result and the goal of the input data-structure is equal to or smaller than the threshold, determine that the predicted action simulatively produces the goal of the input data-structure; and
when the difference between the result and the goal of the input data-structure is larger than the threshold, determine that the predicted action does not produce the goal of the input data-structure.

13. The system according to claim 12, wherein, when the environment belongs to a simulation domain, the execution sub-agent is configured to map the predicted action into a message and send the message to a simulation server; and when the environment belongs to a physical domain, the execution sub-agent is configured to map the predicted action into a robotic instruction and send the robotic instruction to a robot to perform.

14. The system according to claim 1, wherein
the memory further comprises:
an introspection agent, and
a re-adaptation agent; and
when it is determined that the predicted action does not produce the goal of the input data-structure, the system circuitry is configured to:
identify, using the introspection agent, one or more important features of the predicted action,
adapt, using the re-adaptation agent, the one or more important features of the predicted action to obtain a re-adapted action,
determine, using the evaluation agent, whether the re-adapted action simulatively produces the goal of the input data-structure, and
when it is determined that the re-adapted action simulatively produces the goal of the input data-structure, store the input data-structure and the re-adapted action in the database as part of the historically validated data-structures.

15. The system according to claim 14, wherein:
the memory further comprises:
a failure analysis agent; and
when it is determined that the re-adapted action does not produce the goal of the input data-structure, the system circuitry is configured to:
set, using the re-adaptation agent, a repetition counter;
adapt, using the re-adaptation agent, the one or more important features of the re-adapted action to obtain a newly re-adapted action for the input data-structure,
determine, using the evaluation agent, whether the newly re-adapted action simulatively produces the goal of the input data-structure,
when it is determined that the newly re-adapted action simulatively produces the goal of the input data-structure, store the input data-structure and the newly re-adapted action in the database as part of the historically validated data-structures,
when it is determined that the newly re-adapted action does not produce the goal of the input data-structure and the repetition counter satisfies a repetition condition, set the newly re-adapted action as the re-adapted action, repeat to adapt, using the re-adaptation agent, the one or more important features of the re-adapted action to obtain the newly re-adapted action for the input data-structure, and determine, using the evaluation agent, whether the newly re-adapted action simulatively produces the goal of the input data-structure, and
when it is determined that the newly re-adapted action does not produce the goal of the input data-structure and the repetition counter does not satisfy the repetition condition, perform, using the failure analysis agent, failure analysis of the input data-structure.

16. The system according to claim 15, wherein when the system circuitry is configured to perform, using the failure analysis agent, the failure analysis of the input data-structure, the system circuitry is configured to:
identify, using the failure analysis agent, a failure pattern of the input data-structure;
identify, using the failure analysis agent, a failure category of the failure pattern of the input data-structure; and
find, using the failure analysis agent, a cluster of data-structures comprising the failure category in the database.

17. The system according to claim 16, wherein the system circuitry is further configured to:
extract, using the failure analysis agent, a corrected action from the cluster of data-structures;
determine, using the evaluation agent, whether the corrected action for the input data-structure simulatively produces the goal of the input data-structure;
when it is determined that the corrected action simulatively produces the goal of the input data-structure, store the input data-structure and the corrected action in the database as part of the historically validated data-structures; and
when it is determined that the corrected action does not produce the goal of the input data-structure, store the input data-structure and the corrected action in the database as part of historically failed data-structures stored in the database.

18. The system according to claim 16, wherein:
a subject provides a human-provided action for the input data-structure; and
the system circuitry is further configured to:
determine, using the evaluation agent, whether the human-provided action simulatively produces the goal of the input data-structure;
when it is determined that the human-provided action simulatively produces the goal of the input data-structure, store the input data-structure and the human-provided action in the database as part of the historically validated data-structures; and
when it is determined that the human-provided action does not generate the goal of the input data-structure, store the input data-structure and the human-provided action in the database as part of historically failed data-structures stored in the database.

19. A method for computer-based recursive learning, the method comprising:
receiving, by a system comprising a memory for storing instructions, a database for storing historically validated data-structures, and system circuitry in communication with the database and the memory, an input data-structure comprising one or more sensor inputs and a goal of the input data-structure, wherein each historical data-structure comprises a goal of the historical data-structure, a set of sensor data, and a set of corresponding action parameters in response to the set of sensor data for achieving the goal of the historical data-structure;
converting, by the system, the one or more sensor inputs into an input feature vector of a predetermined dimension;
obtaining, by the system, a predicted action corresponding to the input feature vector and the goal of the input data-structure based on the historically validated data-structures;
determining, by the system, whether the predicted action simulatively produces the goal of the input data-structure; and
when it is determined that the predicted action simulatively produces the goal of the input data-structure, storing, by the system, the input data-structure and predicted action in the database as part of the historically validated data-structures.

20. A product for computer-based recursive learning, the product comprising:

machine-readable media other than a transitory signal;
instructions stored on the machine-readable media;
a processor in communication with the machine-readable media; and
wherein when the processor executes the instructions, the processor is configured to:
- receive an input data-structure comprising one or more sensor inputs and a goal,
- convert the one or more sensor inputs into an input feature vector of a predetermined dimension,
- obtain a predicted action corresponding to the input feature vector and the goal based on historically validated data-structures stored in a database,
- determine whether the predicted action simulatively produces the goal, and
- when it is determined that the predicted action simulatively produce the goal, store the input data-structure and predicted action in the database as part of the historically validated data-structures.

* * * * *